United States Patent [19]	[11]  4,266,240
Levy	[45]  May 5, 1981

[54] TELEVISION SYSTEM

[76] Inventor: Paul M. Levy, 3 Butternut Ct., Dix Hills, N.Y. 11746

[21] Appl. No.: 59,322

[22] Filed: Jul. 20, 1979

Related U.S. Application Data

[63] Continuation-in-part of Ser. No. 20,874, Mar. 15, 1979, abandoned.

[51] Int. Cl.³ .............................................. H04N 9/60
[52] U.S. Cl. ......................................... 358/3; 358/88; 358/142; 358/146
[58] Field of Search ................. 358/3, 88, 91, 92, 142, 358/146, 11, 12; 179/15 BY

[56]	References Cited
U.S. PATENT DOCUMENTS

| | | | |
|---|---|---|---|
| 3,061,669 | 10/1962 | Leek | 358/142 |
| 3,488,435 | 1/1970 | Eilenberger | 358/188 |
| 3,637,926 | 1/1972 | Morchand | 358/3 |
| 3,697,675 | 10/1972 | Beard | 358/3 |
| 3,700,793 | 10/1972 | Borsuk | 358/142 |
| 3,896,487 | 7/1975 | Tesler | 358/3 |
| 3,991,266 | 11/1976 | Baer | 358/146 |
| 4,027,333 | 5/1977 | Kaiser | 358/146 |

*Primary Examiner*—Marc E. Bookbinder
*Assistant Examiner*—M. Allen Masinick
*Attorney, Agent, or Firm*—Morgan, Finnegan, Pine, Foley & Lee

[57]	ABSTRACT

A compatible television system which provides means for encoding two video sources of color television picture information, comprising an independent or stereoscopic pair of real-time images, is disclosed. A first video source provides a first video signal, and a second video source provides a second video signal in time synchronism with the first video signal.

The encoding process provides a composite video signal such that a standard television receiver will render the imagery corresponding to the first video source. A non-standard television receiver, i.e., one with means for decoding the second video signal, will render the imagery corresponding to the second video source and/or the imagery corresponding to the first video source. The means for rendering the imagery corresponding to the first video source is provided by a standard video channel as in the standard television receiver, and requires no decoder.

The encoded video signal information may be transmitted to the receiver by means of a standard broadcast channel, a closed circuit channel, video recording and subsequent playback or any sequence of the preceding methods.

In addition, means for decoding the second video signal, as required by the non-standard television receiver, are disclosed. Also disclosed are methods of converting the two video signals, comprising a stereoscopic pair, as rendered by the non-standard television receiver, to a time sequential format which allows stereoscopic viewing on a single display device.

82 Claims, 10 Drawing Figures a) | N | 1 | 2 | 3 | 4 | 5 | 6 | b) | F | 1 | 0 | 1 | 0 | 1 | 0 | c) | f | 1 | 0 | 1 | 0 | 1 | 0 | 1 | 0 | 1 | 0 | 1 | 0 | d) | F⊕f | 0 | 1 | 0 | 1 | 0 | 1 | 0 | 1 | 0 | 1 | 0 |

←——— 4 Frames ———→

Current Frame Method e) $V_E(N,n)$:

| | for N = | | | | | | | |
|---|---|---|---|---|---|---|---|---|
| $h[V_A(N,n)]$ | for N = | 3 | | 4 | | 5 | | 6 |
| $+g[V_B(N,n)]$ | for N = | 3 | | | 4 | 5 | | 6 |
| $-g[V_B(N,n)]$ | for N = | | 3 | 4 | | | 5 | 6 | f) $V_D(N,n)$:

| | for N = | | | | | | | | |
|---|---|---|---|---|---|---|---|---|---|
| $V_B(N,n)$ | for N = | 3 | | 4 | | 5 | | 6 | |
| $+ V_B(N,n)$ | for N = | 2 | | 3 | | 4 | | 5 | |
| $+g^{-1}h[V_A(N,n)]$ | for N = | 3 | 2 | 3 | 4 | 5 | 4 | 5 | 6 |
| $-g^{-1}h[V_A(N,n)]$ | for N = | 2 | 3 | 4 | 3 | 4 | 5 | 6 | 5 |

Repeat Frame Method g) $V_E(N,n)$:

| | for N = | | | | | | | |
|---|---|---|---|---|---|---|---|---|
| $h[V_A(N,n)]$ | for N = | 3 | | 3 | | 5 | | 5 |
| $+g[V_B(N,n)]$ | for N = | 3 | | | 4 | 5 | | 6 |
| $-g[V_B(N,n)]$ | for N = | | 3 | 4 | | | 5 | 6 | h) $V_D(N,n)$:

| | for N = | | | | |
|---|---|---|---|---|---|
| $V_B(N,n)$ | for N = | 2 | 4 | 4 | 6 |
| $+ V_B(N,n)$ | for N = | 1 | 3 | 3 | 5 |

Repeat Merged Frame Method i) $V_E(N,n)$:

| | for N = | | | | | | | |
|---|---|---|---|---|---|---|---|---|
| $h[V_A(N,n)]$ | for N = | 3 | | 3 | | 5 | | 5 |
| $+ h[V_A(N,n)]$ | for N = | 2 | | 2 | | 4 | | 4 |
| $+g[V_B(N,n)]$ | for N = | 3 | | | 4 | 5 | | 6 |
| $-g[V_B(N,n)]$ | for N = | | 3 | 4 | | | 5 | 6 | j) $V_D(N,n)$:

| | for N = | | | | |
|---|---|---|---|---|---|
| $V_B(N,n)$ | for N = | 2 | 4 | 4 | 6 |
| $+ V_B(N,n)$ | for N = | 1 | 3 | 3 | 5 |

FIG. 9

TELEVISION SYSTEM

BACKGROUND OF THE INVENTION

This is a continuation-in-part of application Ser. No. 020,874, now abandoned filed on Mar. 15, 1979.

This invention relates to an improved television system. More specifically, it relates to a television system which provides several methods of encoding two video sources of real-time color television images, which may be either independent or stereoscopic pairs, for transmission over a standard television broadcast channel, or transfer over a closed circuit channel. The encoding methods provide compatibility with standard receivers which render the imagery corresponding to the first video source. The system also provides several methods of decoding the second video signal as required by the non-standard television receiver, and several methods of converting the two video signals representing a stereoscopic pair, for time sequential presentation of stereoscopic imagery on a single display device, e.g., a cathode ray tube (CRT) display.

Stereoscopic television is currently used in industry, education, medicine, and other fields to provide a three-dimensional display of a live or recorded scene which is remote from the viewer's field of view. These currently used systems are closed circuit systems usually requiring two transmission channels, each having the bandwidth of a standard television channel.

A method for encoding and decoding a stereoscopic pair of color video signals transmitted over a standard television broadcast channel is described in U.S. Pat. No. 3,896,487.

According to the invention, the luminance component of the second image of the stereo pair is employed for effecting an additional amplitude modulation of the chrominance subcarrier of the first image, while the chrominance component of the second image of the stereo pair is employed for effecting an additional quadrature modulation of the chrominance subcarrier of the first image by means of a second subcarrier.

As pointed out in the patent, a disadvantage of this method of coding the chrominance component of the second image, is the sensitivity of the color subcarrier signals to distortions of the differential phase type inherent in the NTSC method, as well as to parasitic suppression of one sideband of the modulated signal. It is further shown in the patent, that the encoding methods provide compatibility only with standard monochrome television receivers, and not with standard color television receivers.

It is believed that prior to the present invention, there has not been available a compatible television system having means for encoding two video sources of color television picture information, comprising an independent or stereoscopic pair of realtime images, for transmission over a standard television broadcast channel, and having means for recovering the two video source signals for simultaneous display on two display devices or converting them into a format for time sequential presentation of stereoscopic imagery on a signal display device. The attributes of such a system are apparent. They include the capability of conveying and rendering two real-time color television pictures by means of a standard broadcast channel while maintaining compatibility with standard monochrome and color television receivers. Thus, the need for such a system has gone unfulfilled.

It is accordingly a general object of the present invention to overcome the aforementioned limitations and drawbacks associated with known encoding and decoding methods and to fulfill the needs mentioned by providing a television system having all of the desirable attributes noted above.

It is a particular object of the invention to provide an improved television system.

It is a further object of the invention to provide a television system utilizing techniques of encoding two video signals to produce a composite transmission which is compatible with existing monochrome and color television receivers.

Another object of the invention is to provide a television system utilizing decoding techniques which permit individual or simultaneous display of the encoded video signals.

It is still another object of the invention to provide techniques for converting the two video signals comprising a stereoscopic pair into a format for time sequential presentation of stereoscopic imagery on a signal display device.

Other objects will be apparent in the following detailed description and the practice of the invention.

SUMMARY OF THE INVENTION

The foregoing and other objects and advantages which will be apparent in the following detailed description of the preferred embodiment, or in the practice of the invention, are achieved by the invention disclosed herein, which generally may be characterized as a television system comprising: means for providing a first video signal; means for providing a second video signal in time synchronism with said first video signal; encoding means for forming a composite video signal of said first video signal and said second video signal, said encoding means including means for amplitude scaling said first video signal and said second video signal; means for transmitting said composite video signal to means for receiving said composite video signal, said receiving means including means for decoding said second video signal from said received composite video signal, said decoding means including means for amplitude scaling said received composite video signal.

BRIEF DESCRIPTION OF THE DRAWINGS

Serving to illustrate exemplary embodiments of the invention are the drawings of which:

FIG. 9 is a timing diagram for the alternate embodiments of the video encoder, video decoder and converter.

DESCRIPTION OF PREFERRED EMBODIMENT

Figure 10:
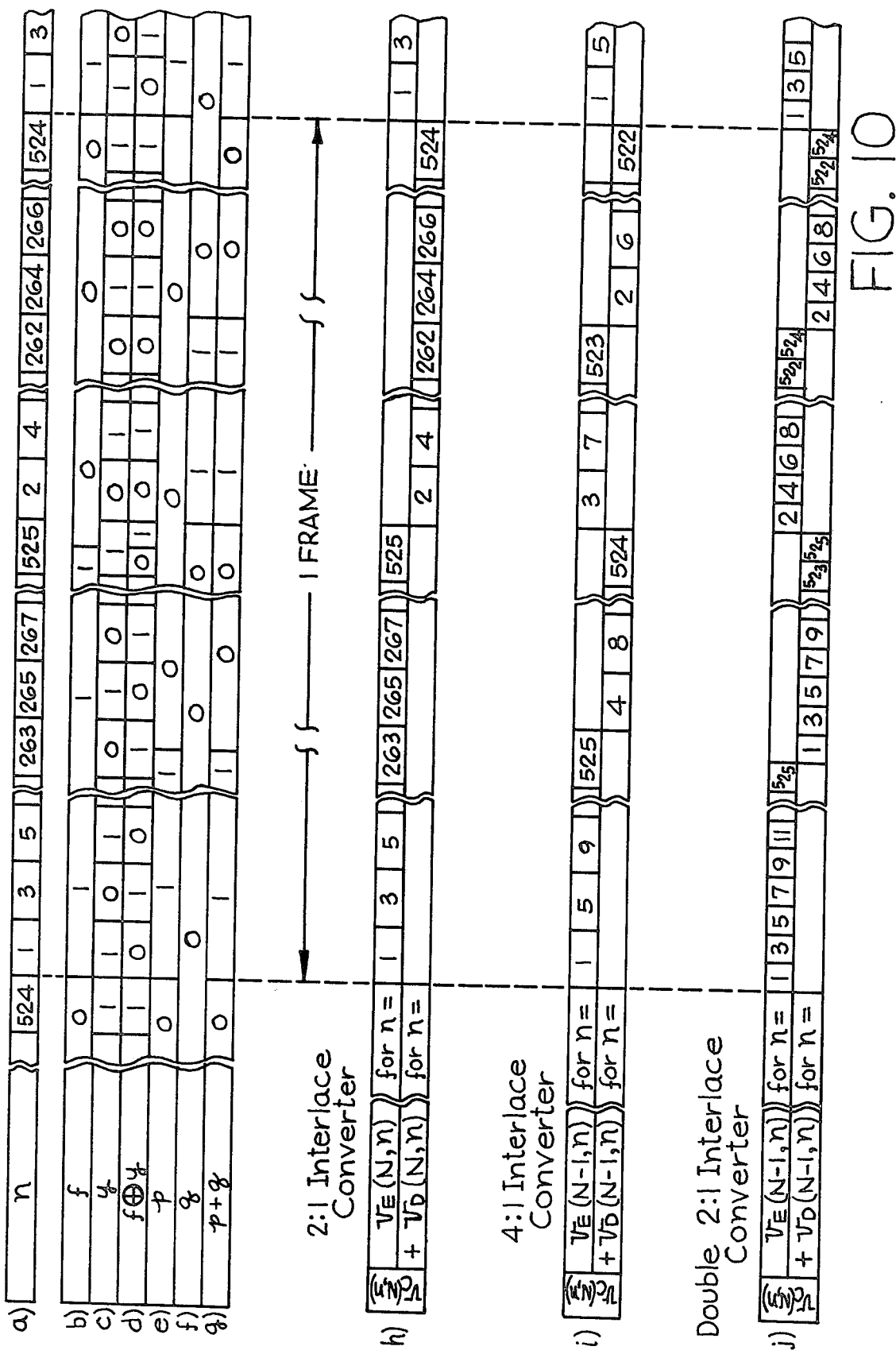
FIG. 10 is a continuation of the timing diagram for the alternate embodiments of the video encoder, video decoder and converter.

In order to understand the symbolic representation of the encoding and decoding functions that form part of this description and their schematic embodiments, as well as the converter embodiment, it will be helpful to refer to the timing diagrams shown in FIGS. 9 and 10.

In FIG. 9a, N represents the current television frame number of the video source, where sequential frames are consecutively numbered.

In FIG. 9b, F is a derived binary logic signal indicating an odd or an even current frame number, where $F=1$ represents an odd number and $F=0$ represents an even number. In FIG. 9c, f is a derived binary logic signal indicating an odd or an even current television field of the video source where $f=1$ represents an odd field comprised of odd numbered television lines, and $f=0$ represents an even field comprised of even numbered television lines. This relationship is illustrated in FIGS. 10a and 10b, where FIG. 10a shows the current television line number, n, of the video source and FIG. 10b shows a time expanded representation of f. It is seen that the odd field comprises the set of consecutive odd numbered television lines and the even field comprises the set of intervening consecutive even numbered television lines. In FIG. 9d, $F \oplus f$ is a derived binary logic signal which represents the logical Exclusive OR function of F and f. In FIG. 10c, y is a derived binary logic signal which is preset at the beginning of a frame, and toggles from line to line. In FIG. 10d, $f \oplus y$ is a derived binary logic signal which represents the logical Exclusive OR function of f and y. In FIG. 10e, p is a derived binary logic signal decoding n(odd) and $n \leq 263\frac{1}{2}$. In FIG. 10f, q is a derived binary logic signal denoting n(even) and $n \leq 262$. In FIG. 10g, p+q is a derived binary logic signal which represents the logical Inclusive OR function of p and q. Other logical functions such as AND, OR and NEGATION are represented by the symbols ·, + and ⁻, respectively.

The derived binary logic signals described above are formed by currently used techniques, however, in order to derive the F signal at the receiver, it is necessary to transmit an odd numbered frame synchronizing signal, in addition to the standard synchronizing signals, to uniquely tag odd numbered frames. This synchronizing signal may conveniently be transmitted during the vertical retrace of alternate frames. Methods of inserting this additional synchronizing signal at the transmitter and recovering it at the receiver are not addressed since they are well known by those skilled in the art.

In order to afford a complete understanding of the invention and an appreciation of its advantages, a description of several alternate embodiments is presented below.

ENCODING AND DECODING METHODS

Three alternative and preferred methods of performing the encoding and corresponding decoding functions are disclosed. These methods are, the Current Frame Method, the Repeat Frame Method and the Repeat Merged Frame Method. The advantages of each of these methods relative to the others will become apparent from the detailed descriptions that follow.

Those functions as may be required for transmission, reception, synchronization, black level insertion and methods for the display of the rendered video imagery are not addressed since they are well known by those skilled in the art. However, it is noted that in the exemplary embodiment of the invention, the encoded video signal information may be transmitted to the receiver by means of a standard broadcast channel, a closed circuit channel, video recording and subsequent playback or any sequence of the preceding methods.

The encoding process provides a composite video signal such that a standard television receiver will render the imagery corresponding to the first video source. A non-standard television receiver, i.e., one with means for decoding the second video signal, will render the imagery corresponding to the second video source and/or the imagery corresponding to the first video source. The means for rendering the imagery corresponding to the first video source is provided by a standard video channel as in the standard television receiver, and requires no decoder.

The encoded video signal, in each of the three methods comprises the sum of a first video signal component and a second video signal component. The methods are named by the technique employed in forming the first video signal component. The technique used in forming the second video signal component is identical for all three methods, except for the variants of the Current Frame Method. The encoding functions, their corresponding decoding functions and their physical embodiments are described below.

I. The Current Frame Method

(a) Encoding

The first video signal component is formed, during either an odd numbered frame or an even numbered frame, by scaling the amplitude of the first video signal, corresponding to the current frame by a first factor.

The second video signal component is formed by scaling the amplitude of the second video signal by a second factor, which is smaller than the first factor, and then alternating the polarity of the resultant at the frame rate, with the polarity alternation occurring in midframe.

The encoded video signal comprises the video sum of the first and second video signal components.

The encoding function for the Current Frame Method may be written as:

$$V_E(N,n) = h\,[V_A(N,n)] \\ + g\,[V_B(N,n)] \cdot \overline{[F \oplus f]} \\ - g\,[V_B(N,n)] \cdot [F \oplus f] \quad (1)$$

where:
N≡Current frame number
n≡Current line member
h≡First scaling factor (a constant term)
g≡Second scaling factor (a constant term or a nonlinear term; g<h)
$V_A(N,n)$≡First video signal corresponding to frame N, line n
$V_B(N,n)$≡Second video signal corresponding to frame N, line n
$V_E(N,n)$≡Encoded video signal corresponding to frame N, line n F⊕f ≡ Derived binary logic gating signal
$\overline{F \oplus f}$ ≡ Logic inverse of F⊕f.

The resulting encoded signal is shown as a function of time in FIG. 9e.

Figure 1:
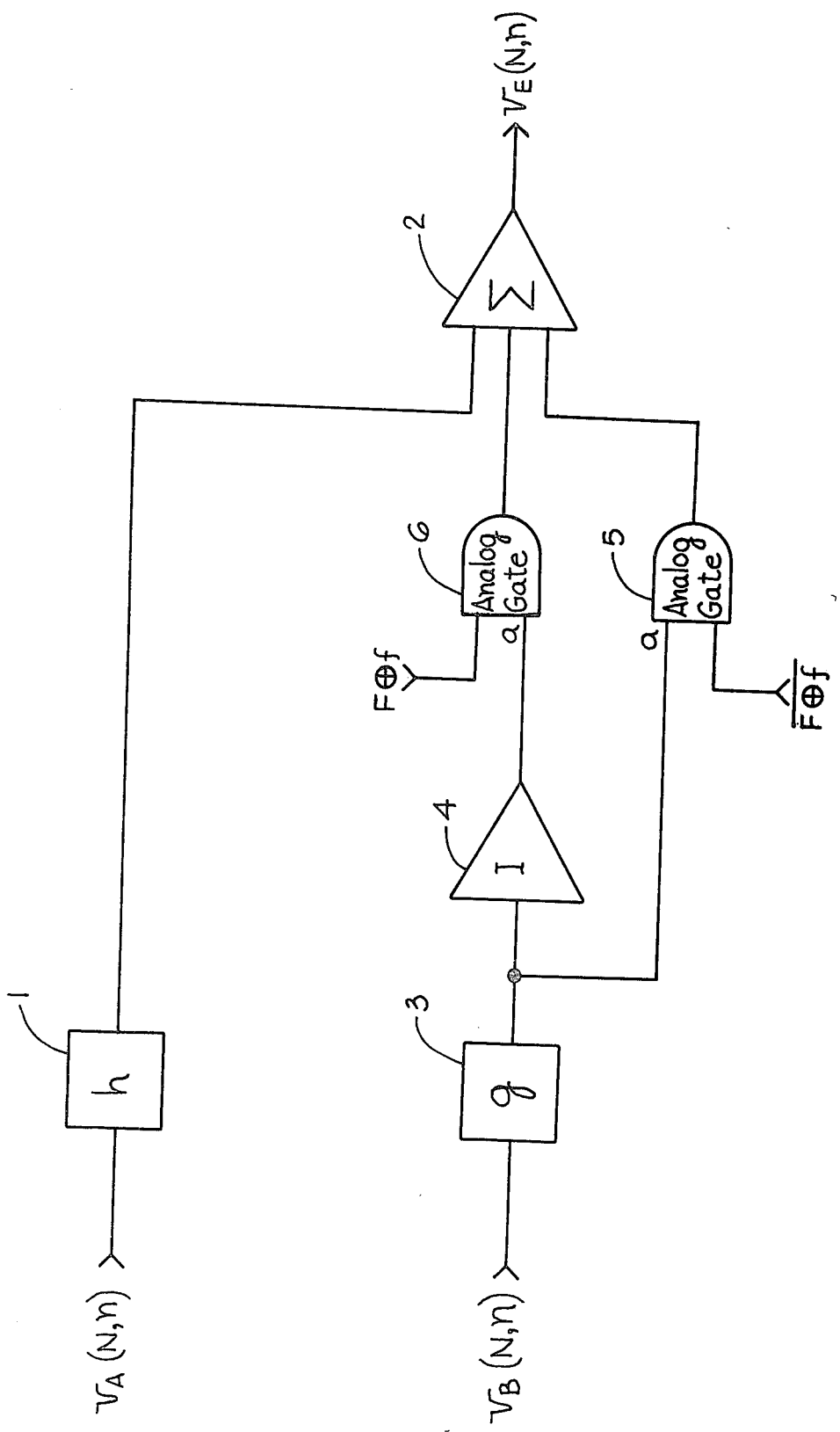
FIG. 1 is a block diagram of the video encoder utilized in the Current Frame Encoding method.

The current frame encoder implementation is shown in FIG. 1. As shown therein, the first video signal, $V_A(N,n)$, is applied to Attenuator 1 with transfer function h. The resulting signal, $h[V_A(N,n)]$, representing the first component of the encoded video signal, is applied to one input of Analog Summing Amplifier 2. The second video signal, $V_B(N,n)$, is applied to Attenuator 3 with transfer function g to provide the signal $g[V_B(N,n)]$. The resulting signal, $g[V_B(N,n)]$, is applied to Video Inverter 4, to provide its inverse signal $-g[V_B(N,n)]$. These latter two signals are then gated by Analog Gates 6 and 5 (the analog input is denoted by "a"), to provide the requisite alternating polarity signal, comprising the second component of the encoded video signal, to Analog Summing Amplifier 2. The gating signals, F⊕f and $\overline{F \oplus f}$ provide the polarity switching function.

The output of Analog Summing Amplifier 2 is the encoded composite video signal corresponding to the encoding function represented by equation (1).

A standard television receiver, or the standard video channel of a non-standard receiver, receiving this encoded composite video signal, will render the imagery corresponding essentially to the first video signal since the amplitude of the second video signal component is much smaller than the amplitude of the first video signal component, as a result of the selection of the values of the first and second scaling factors. Additionally, visual integration of the imagery corresponding to the second video signal tends to cancel its visual effect as a result of its polarity alternation from frame to frame and from field to field.

(b) Decoding

The second video signal is extracted from the received composite video signal by forming the absolute difference between the currently arriving composite video signal, scaled by the scaling inverse of the encoder's second scaling factor, and the similarly scaled received composite video signal which arrived one frame earlier, with its chrominance component inverted.

The decoding function for the Current Frame Method may be written as:

$$V_D(N,n) = [g^{-1}[V_E(N,n)] - g^{-1}[V_E^*(N-1,n)]] \cdot \overline{F \oplus f} \qquad (2)$$
$$+ [-g^{-1}[V_E(N,n)] + g^{-1}[V_E^*(N-1,n)]] \cdot [F \oplus f]$$

where: Symbolic notation is as previously defined, and in addition $g^{-1}$ ≡ Scaling inverse of g
$V_E^*(N-1,n)$ ≡ Received composite video signal corresponding to frame N−1, line n, with inverted chrominance component, as indicated by the asterisk
$V_D(N,n)$ ≡ Decoded video signal corresponding to frame N, line n.

Chrominance inversion is required to preserve the correct phase relative to the chrominance subcarrier.

The resulting video signal that is displayed on a non-standard television receiver, i.e., one having means to decode the second video signal, is found by performing the specified decoding function on the encoded video signal. The result may be expressed as:

$$V_D(N,n) = V_B(N,n) + V_B^*(N-1,n) \qquad (3)$$
$$+ [g^{-1}h[V_A(N,n)] - g^{-1}h[V_A^*(N-1,n)]] \cdot \overline{F \oplus f}$$
$$+ [g^{-1}h[V_A^*(N-1,n)] - g^{-1}h[V_A(N,n)]] \cdot [F \oplus f]$$

The resulting decoded signal is shown as a function of time in FIG. 9f.

Figure 2:
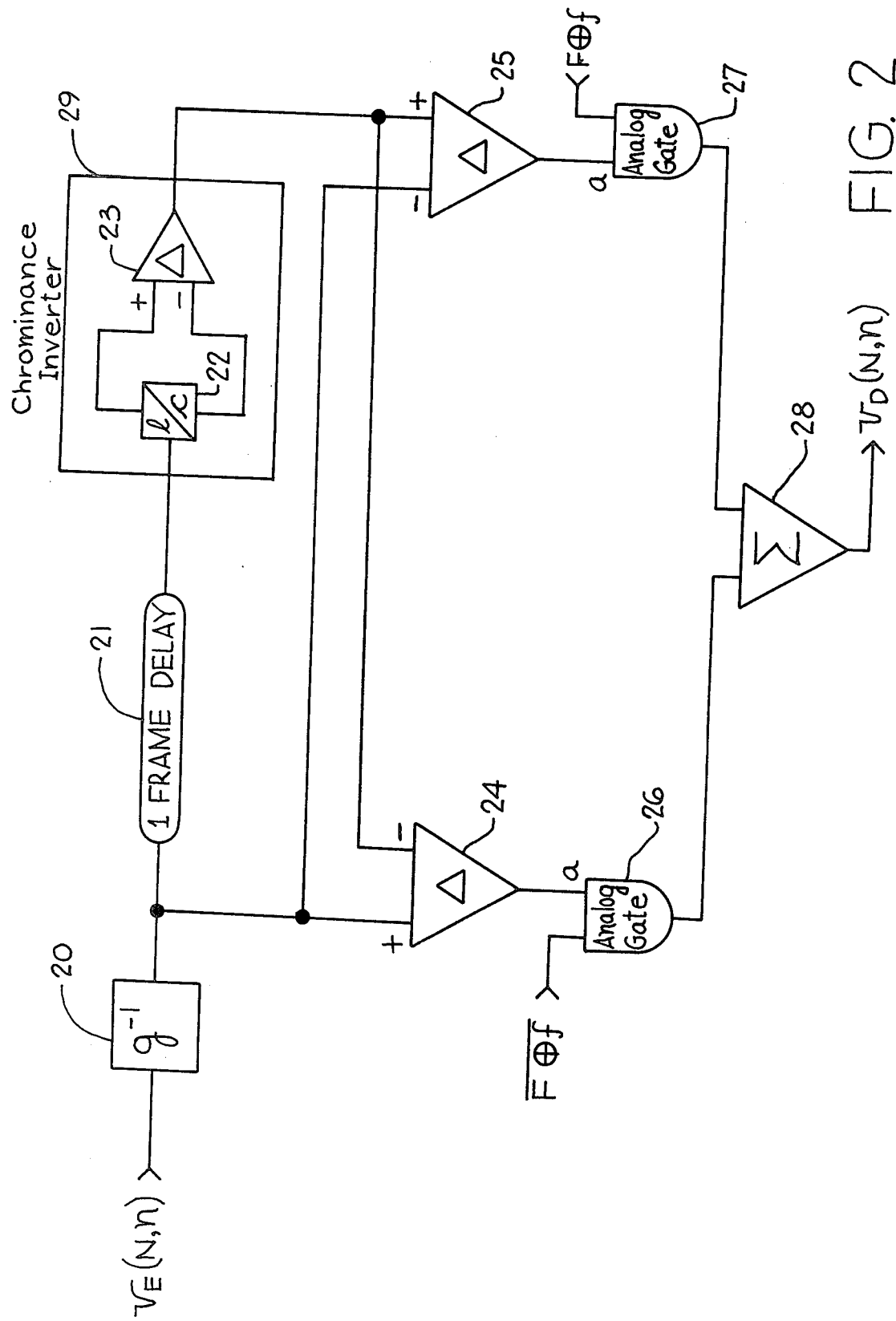
FIG. 2 is a block diagram of the video decoder utilized in the Current Frame Decoding method.

The current frame decoder implementation is shown in FIG. 2. As shown therein, the received composite video signal, $V_E(N,n)$, is applied to Amplifier 20, with transfer function $g^{-1}$, to provide a first component, $g^{-1}[V_E(N,n)]$. This component is also delayed for one frame time by Frame Delay Unit 21 to provide the signal $g^{-1}[V_E(N-1,n)]$, which is applied to Chrominance Inverter 29, comprising Luminance/Chrominance Splitter 22 and Analog Difference Amplifier 23. The output signal of Chrominance Inverter 29 provides a second component, $g^{-1}[V_E^*(N-1,n)]$. A pair of difference signals are formed by Analog Difference Amplifiers 24 and 25. The first difference signal, comprising the difference between the second component and the first component, $g^{-1}[V_E^*(N-1,n)] - g^{-1}[V_E(N,n)]$, is formed by Analog Difference Amplifier 25, while the second difference signal, comprising the difference between the first component and the second component, $g^{-1}[V_E(N,n)] - g^{-1}[V_E^*(N-1,n)]$, is formed by Analog Difference Amplifier 24. These pair of difference signals are gated by Analog Gates 27 and 26 under control of gating signals $\overline{F \oplus f}$ and F⊕f, respectively, and summed by Analog Summing Amplifier 28 to yield the decoded video signal $V_D(N,n)$ corresponding to equation (3).

The second video signal component which is the desired one, is seen to be a two frame sum of the current and preceding frames (merged frame), while the first video signal component representing a contaminant of the desired signal, is seen to be the absolute difference between these frames, scaled by $g^{-1}h$. The scaling factor $g^{-1}h$ and the image motion rate must be considered in evaluating the contamination level of the desired video signal. In order to eliminate this contaminant, resort may be made to the Repeat Frame Method. Since the Repeat Frame Encoder replaces even numbered frames of the first video source with a repeat of the preceding odd numbered frames, the Repeat Frame Decoder, by forming the absolute difference of identical contiguous frames, completely cancels the contaminant, leaving an uncontaminated second video signal.

A variant of the Current Frame Method described above replaces the One Frame Delay of the Current Frame Decoder, shown in FIG. 2, with a one line delay, and replaces the F⊕f and the $\overline{F \oplus f}$ gating signals with F⊕y and $\overline{F \oplus y}$, respectively, in both the Current Frame Encoder, shown in FIG. 1, and the Current Frame Decoder, shown in FIG. 2. This variant, although potentially less costly to implement, degrades the vertical resolution of the imagery corresponding to the second video source.

A second variant of the Current Frame Method described above replaces the One Frame Delay of the Current Frame Decoder shown in FIG. 2 with a one field less one half line delay and also deletes the Chrominance Inverter there shown. Chrominance inversion is not required since the chrominance phase of the video signal delayed by an even number of television lines corresponds to the undelayed video signal. In addition, the F⊕f and F⊕f gating signals shown in FIGS. 1 and 2 are replaced by f and f, respectively.

II. The Repeat Frame Method

(a) Encoding

The first video signal component is formed, during an odd numbered frame, by scaling the amplitude of the first video signal, corresponding to the current frame by a first factor, while during the succeeding even numbered frame, this previously formed signal is repeated, with its chrominance component inverted.

The second video signal component is formed, as in the Current Frame Method, by scaling the amplitude of the second video signal by a second factor, which is smaller than the first factor, and then alternating the polarity of the resultant at the frame rate, with the polarity alternation occurring in midframe.

The encoded video signal comprises the video sum of the first and second video signal components.

The encoding function for the Repeat Frame Method may be written as:

$$V_E(N,n) = h[V_A(N,n)] \cdot [F] \quad (4)$$
$$+ h[V_A^*(N-1,n)] \cdot [\overline{F}]$$
$$+ g[V_B(N,n)] \cdot [\overline{F \oplus f}]$$
$$- g[V_B(N,n)] \cdot [F \oplus f]$$

where: Symbolic notation is as previously defined, and in addition- $V_A^*(N-1,n) \equiv$ First video signal corresponding to frame $N-1$, line n, with inverted chrominance component.

The resulting encoded signal is shown as a function of time in FIG. 9g.

Figure 3:
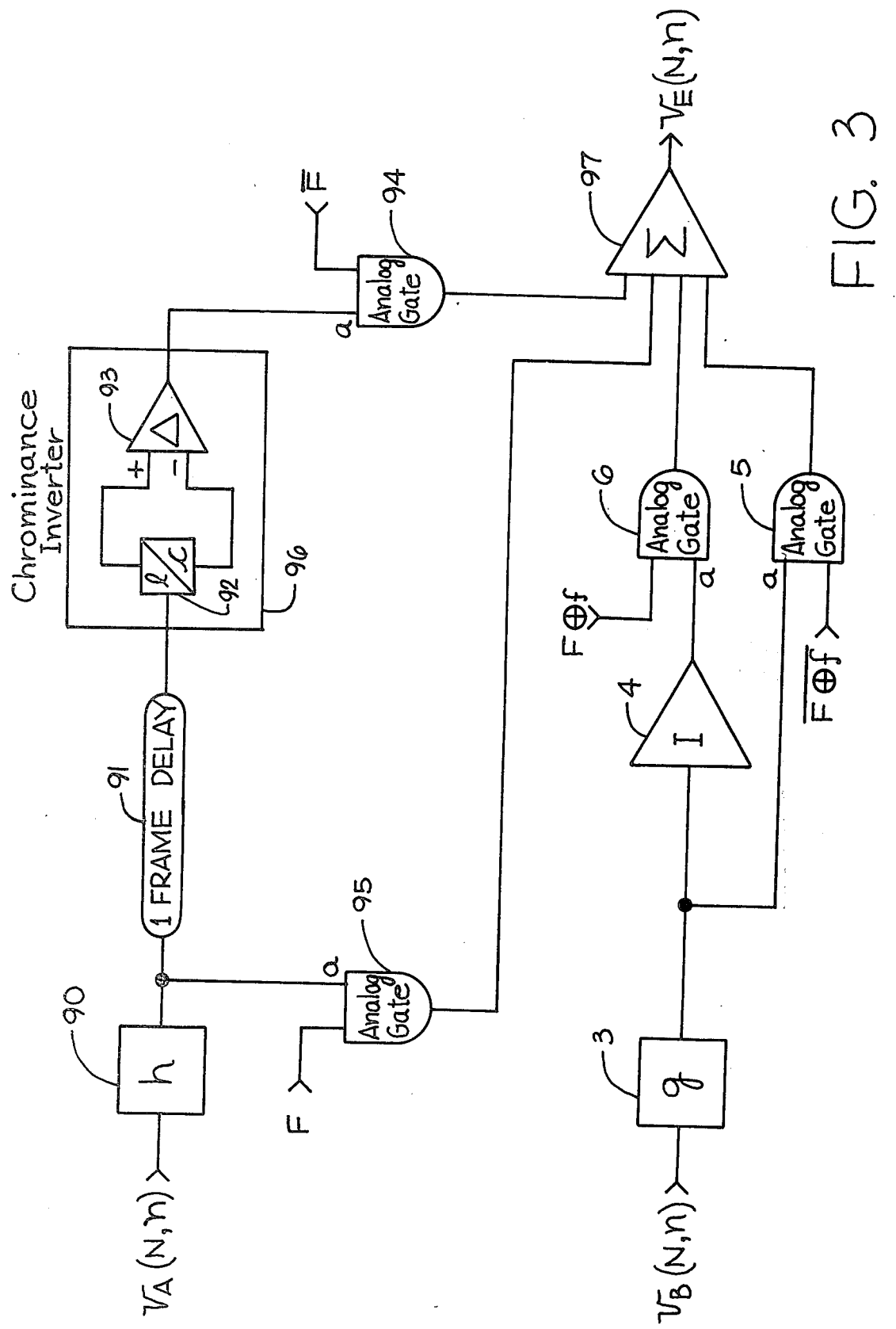
FIG. 3 is a block diagram of the video encoder utilized in the Repeat Frame Encoding method.

The repeat frame encoder implementation is shown in FIG. 3. As shown therein, the first video signal, $V_A(N,n)$, is applied to Attenuator 90, with transfer function, h, to provide signal $h[V_A(N,n)]$. This signal is also delayed for one frame time by Frame Delay Unit 91 to provide the signal $h[V_A(N-1,n)]$, which is applied to Chrominance Inverter 96, comprising Luminance/Chrominance Splitter 92 and Analog Difference Amplifier 93. The output signal of Chrominance Inverter 96 is $h[V_A^*(N-1,n)]$. During odd numbered frames, indicated by F=1, Analog Gate 95 passes the scaled first video signal, $h[V_A(N,n)]$, to Analog Summing Amplifier 97, while during even numbered frames, indicated by F=0, Analog Gate 94 passes the Chrominance Inverter 96 output signal, $h[V_A^*(N-1,n)]$, to Analog Summing Amplifier 97. It is this pair of time gated signals that comprise the first video component of the encoded video signal.

The second video signal, $V_B(N,n)$, is processed, as described above for the Current Frame Method encoder, to produce the second component of the encoded video signal.

The output of Analog Summing Amplifier 97 is the encoded video signal correponding to equation (4).

A standard television receiver, or the standard video channel of a non-standard receiver, receiving this encoded composite video signal, will render the imagery corresponding essentially to the first video signal, for the reasons cited in the description of the Current Frame Method. The frame repeating of the first video signal, however, may result in motion jerkiness when the image motion exceeds a specified rate.

(b) Decoding

The second video signal is extracted from the encoded composite video signal by forming, during even numbered frames, the absolute difference between the currently arriving encoded video signal, scaled by the scaling inverse of the encoder's second scaling factor, and the similarly scaled encoded video signal which arrived one frame earlier with its chrominance component inverted; and forming during odd numbered frames, the absolute difference between the similarly scaled encoded video signal which arrived two frames earlier, and the similarly scaled encoded video signal which arrived one frame earlier, with its chrominance component inverted.

The decoding function for the Repeat Frame Method may be written as:

$$V_D(N,n) = [g^{-1}[V_E(N-2,n)] - g^{-1}[V_E^*(N-1,n)]] \cdot [F \cdot f] \quad (5)$$
$$+ [g^{-1}[V_E^*(N-1,n)] - g^{-1}[V_E(N-2,n)]] \cdot [F \cdot \overline{f}]$$
$$+ [g^{-1}[V_E^*(N-1,n)] - g^{-1}[V_E(N,n)]] \cdot [\overline{F} \cdot f]$$
$$+ [g^{-1}[V_E(N,n)] - g^{-1}[V_E^*(N-1,n)]] \cdot [\overline{F} \cdot \overline{f}]$$

where: Symbolic notation is as previously defined, and in addition- $V_E(N-2,n) \equiv$ Encoded video signal corresponding to frame $N-2$, line n.

The resulting video signal that is displayed on a non-standard television receiver is found by performing the specified decoding function on the encoded video signal. The result may be expressed as:

$$V_D(N,n) = V_B^*(N-1,n) \quad (6)$$
$$+ V_B(N-2,n) \cdot [F]$$
$$+ V_B(N,n) \cdot [\overline{F}]$$

The resulting decoded signal is shown as a function of time in FIG. 9h.

The second video signal component, which is the desired one, is seen to be, for odd numbered frames, the sum of the second video signals corresponding to the preceding two frames, while for even numbered frames, it is the sum of the second video signals corresponding to the current and preceding frames, resulting in a repeat merged frame display of the second video source.

The first video signal component, representing the contaminant, has been completely eliminated.

Figure 4:
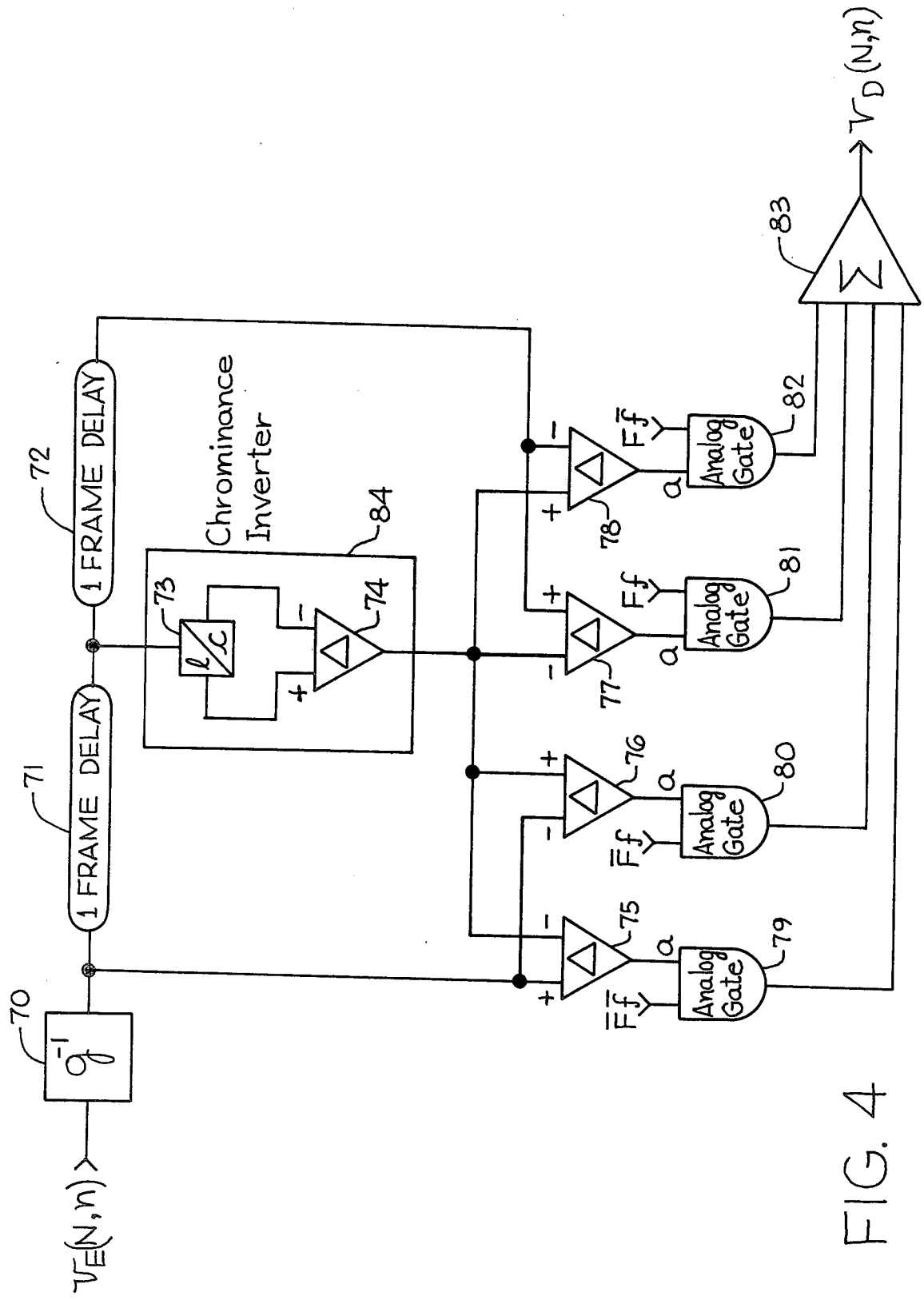
FIG. 4 is a block diagram of the video decoder utilized in the Repeat Frame and Repeat Merged Frame Decoding methods.

The repeat frame decoder implementation is shown in FIG. 4. As shown therein, the composite video signal, $V_E(N,n)$, is applied to Amplifier 70, with transfer function $g^{-1}$, to provide a first component, $g^{-1}[V_E(N,n)]$. This component is also delayed for one frame time by Frame Delay Unit 71 to provide the signal, $g^{-1}[V_E(N-1,n)]$, which is applied to Chrominance Inverter 84 and Frame Delay Unit 72. The output signal of Chrominance Inverter 84 provides a second component, $g^{-1}[V_E^*(N-1,n)]$, and the output of Frame Delay Unit 72 provides a third component, $g^{-1}[V_E(N-2,n)]$. Four algebraic difference signals are formed by the Analog Difference Amplifiers 75, 76, 77 and 78 where the first difference between the third component and the second component, $g[V_E(N-2,n)]-g^{-1}[V_E^*(N-1,n)]$, is formed by Analog Difference Amplifier 77; the second difference, between the second component and the third component, $g^{-1}[V_E*(N-1,n)]-g^{-1}[V_E(N-2,n)]$, is formed by Analog Difference Amplifier 78; the third difference, between the second component and the first component, $g^{-1}[V_E*(N-1,n)]-g^{-1}[V_E(N,n)]$, is formed by Analog Difference Amplifier 76; and the fourth difference, between the first component and the second component, $g^{-1}[V_E(N,n)]-g^{-1}[V_E*(N-1,n)]$, is formed by Analog Difference Amplifier 75. These four difference signals are time multiplexed by their associated Analog Gates, as shown, into Analog Summing Amplifier 83 to yield the video signal, $V_D(N,n)$, corresponding to the decoding function described by equation (6). The gating signals Ff, F̄f, F̄f̄ and Ff̄ provide the appropriate time multiplexing.

The frame repeating of the first video source on a standard television receiver, or the standard video channel of a non-standard television receiver, may cause motion jerkiness when the image motion exceeds a specified rate.

The Repeat Merged Frame Method described below, avoids the problem by merging each odd numbered frame with its preceding even numbered frame, and repeating this merged frame during the succeeding even numbered frame.

III. The Repeat Merged Frame Method

(a) Encoding

The first video signal component is formed, during an odd numbered frame, by summing the first video signal, amplitude scaled by a first factor, corresponding to the current frame, and the similarly scaled first video signal corresponding to the preceding frame, with its chrominance component inverted, to form a merged frame, while during the succeeding even numbered frame, this previously formed merged frame is repeated with interchanged chrominance inverted components.

The second video signal component is formed, as in the preceding methods, by scaling the amplitude of the second video signal by a second scaling factor, which is smaller than the first factor, and then alternating the polarity of the resultant at the frame rate, with the polarity alternation occurring in midframe.

The encoded video signal comprises the video sum of the first and second video signal components.

The encoding function for the Repeat Merged Frame Method may be written as:

$$V_E(N,n) = h[V_A*(N-1,n)] \\ + h[V_A(N,n)] \cdot [F] \\ + h[V_A(N-2,n)] \cdot [\overline{F}] \\ + g[V_B(N,n)] \cdot [\overline{F \oplus f}] \\ - g[V_B(N,n)] \cdot [F \oplus f] \quad (7)$$

where: Symbolic notation is as previously defined, and in addition—

$V_A(N-2,n) \equiv$ First video signal corresponding to frame N−2, line n.

The resulting encoded signal is shown as a function of time in FIG. 9e.

Figure 5:
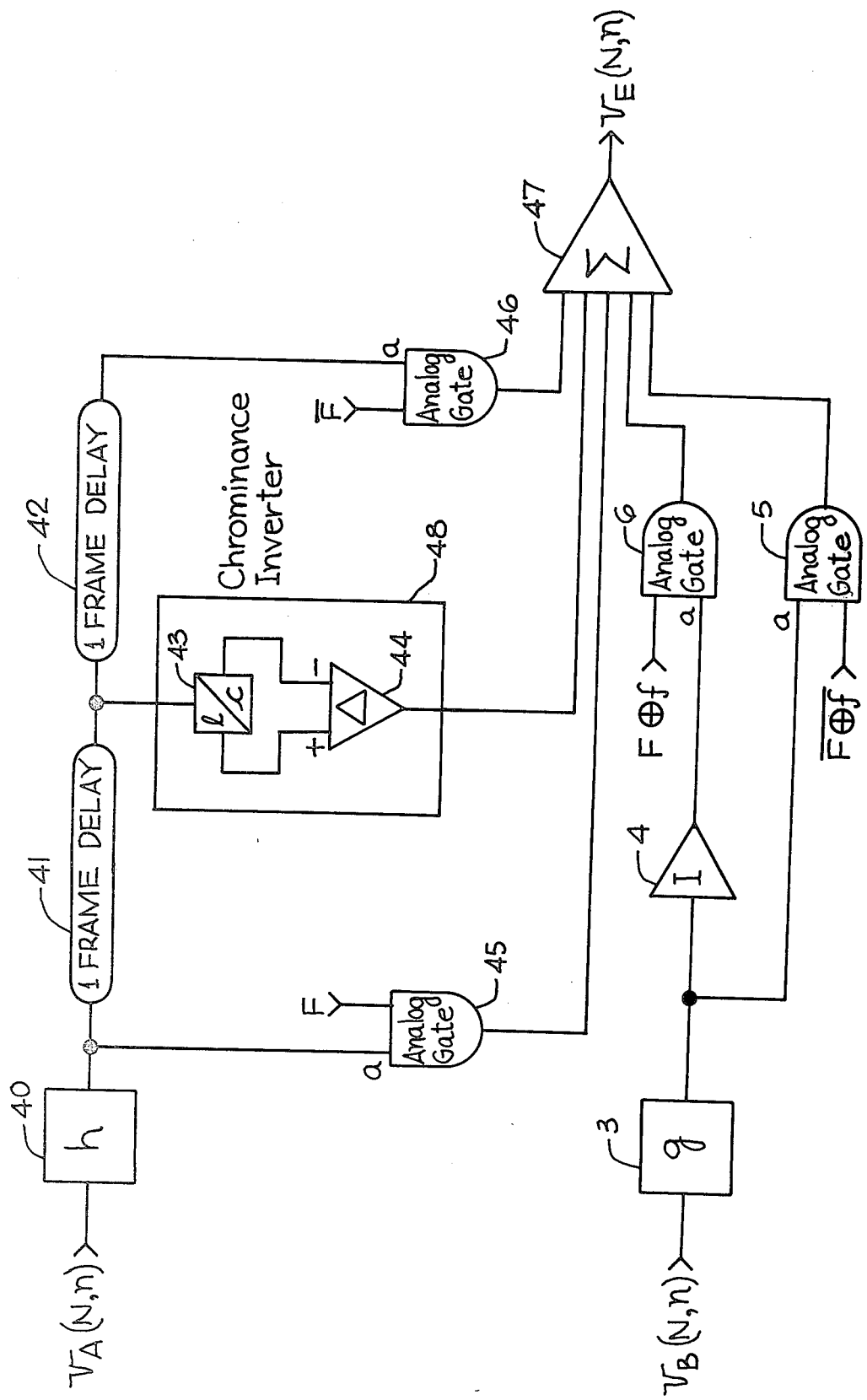
FIG. 5 is a block diagram of the video encoder utilized in the Repeat Merged Frame Encoding method.

The encoder implementation is shown in FIG. 5. As shown therein, the first video signal, $V_A(N,n)$, is applied to Attenuator 40 with transfer function, h, to provide a first component, $h[V_A(N,n)]$. This component is also delayed for one frame time by Frame Delay Unit 41 to provide the signal, $h[V_A(N-1,n)]$, which is applied to Chrominance Inverter 48 and Frame Delay Unit 42. The output signal of Chrominance Inverter 48 provides a second component, $h[V_A*(N-1,n)]$, and the output of Frame Delay Unit 42 provides a third component, $h[V_A(N-2,n)]$.

The first and third components are time multiplexed by their associated Analog Gates 45 and 46, under control of signals F and F̄, respectively, into Analog Summing Amplifier 47. The second component provides a third input to Analog Summing Amplifier 47. It is the sum of these three components that comprise the first video component of the encoded video signal.

The second video signal, $V_B(N,n)$, is processed, as described above for the Current Frame Method encoder, to produce the second component of the encoded video signal.

The output of Analog Summing Amplifier 47 is the encoded video signal corresponding to the encoding function described by equation (7).

A standard television receiver, or the standard video channel of a non-standard receiver, receiving this encoded composite video signal, will render the imagery corresponding essentially to the first video signal, for the reasons cited in the description of the Current Frame Method. The displayed image is a repeat merged frame of the first video source.

(b) Decoding

The second video signal is extracted from the encoded composite video signal by the same decoder used for implementing the Repeat Frame Method, and its description is applicable.

The resulting video signal that is displayed on a non-standard television receiver is a repeat merged frame display of the second video source and is also represented by equation (6).

The resulting decoded signal is shown as a function of time in FIG. 9j.

As in the Repeat Frame Method, the first video signal component, representing the contaminant, has been completely eliminated.

CONVERSION METHODS

The conversion methods, and the implementation thereof, provide the means of converting the two video signals, comprising a stereoscopic pair, as rendered by the non-standard receiver, to a time sequential format which allows stereoscopic viewing on a single display device. Three methods of performing the conversion function are disclosed. These are the 2:1 Interlace Method, the 4:1 Interlace Method and the Double 2:1 Interlace Method.

Although described herein as applied to a compatible stereoscopic television system, the conversion methods disclosed will provide the identical function when applied to a non-compatible stereoscopic television system, such as a two channel closed circuit system.

I. The 2:1 Interlace Converter

This converter time multiplexes the odd fields, corresponding to the odd numbered television lines of the left image of the stereoscopic pair, and the even fields, corresponding to the even numbered television lines of the right image of the stereoscopic pair.

The resulting imagery, appearing on a single display device, e.g., a cathode ray tube, must be viewed with special spectacles, or a functional equivalent, that unblock the left and right eyes in synchronism with the left and right fields displayed. (See, e.g., U.S. Pat. No. 3,903,358). The displayed line sequence is shown in FIG. 10h.

This converter provides only half the available number of television lines, at half the standard refresh rate to each eye, which may result in a less than satisfactory image in terms of vertical resolution and flicker.

Figure 6:
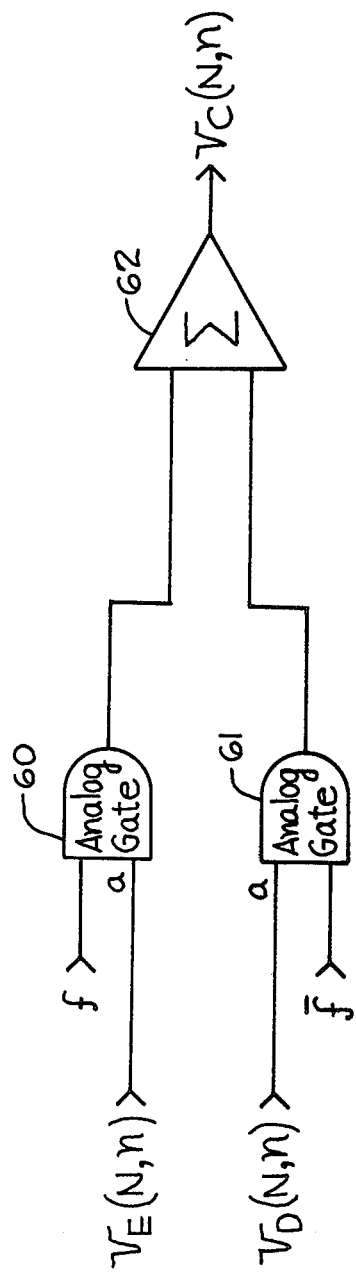
FIG. 6 is a block diagram of the 2:1 Interlace Converter.

The 2:1 interlace converter implementation is shown in FIG. 6. As shown therein, the Analog Gates 60 and 61, under control of f and $\bar{f}$, respectively, allow the transmission of the left image video signal, represented by $V_E(N,n)$ during odd fields, and the right image video signal represented by $V_D(N,n)$, during even fields to Analog Summing Amplifier 62. The video output of this amplifier, $V_c(N,n)$, is the converted video signal, and is displayed in the standard 2:1 interlace format.

II. The 4:1 Interlace Converter

This converter re-orders the television line sequence of the received left and right images, as provided by the non-standard (stereoscopic) receiver, to provide a 4:1 interlaced display format. The display line sequence is chosen to provide two half fields for the left eye, interleaved with 2 half fields for the right eye, during one frame time. The resulting image sequence, left-right-left-right, provides each eye with a 60 Hertz flash rate, as in standard television receivers, thus alleviating the flicker problem of the 2:1 Interlace Converter. The two half fields for the left eye comprise the odd numbered lines of the left image while the two half fields for the right eye comprise the even numbered lines of the right image. The displayed line sequence is shown in FIG. 10i.

As in the 2:1 Interlace Converter, only half the number of available television lines is provided to each eye, resulting in a loss of available resolution. The resulting imagery, appearing on a single display device, must be viewed with special spectacles, or a functional equivalent, that unblock the left and right eyes in synchronism with the left and right half fields displayed.

Figure 7:
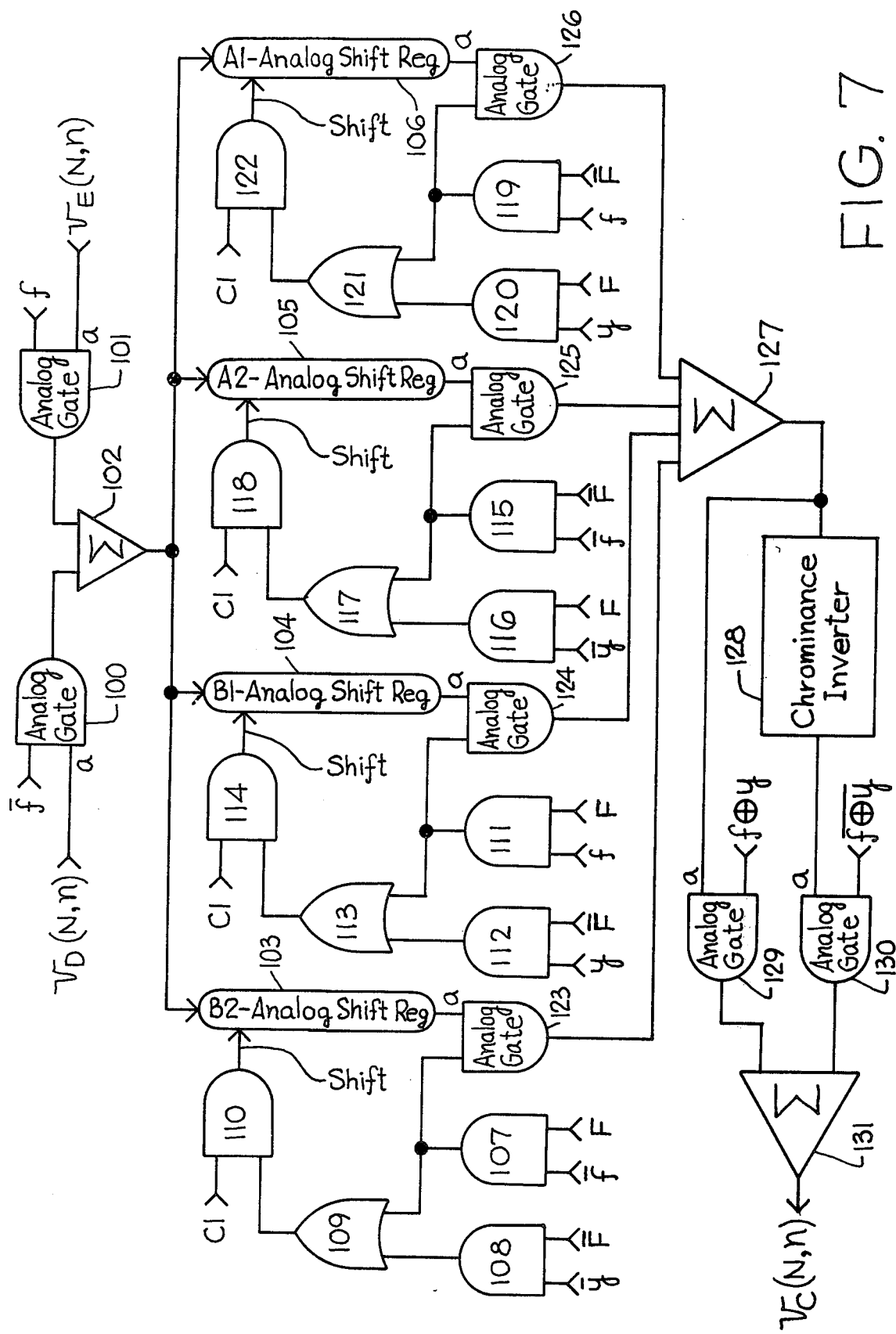
FIG. 7 is a block diagram of the 4:1 Interlace Converter.

The 4:1 interlace converter implementation is shown in FIG. 7. As shown therein, the left image video signal, represented by $V_E(N,n)$, is applied to Analog Gate 101 and the right image video signal, represented by $V_D(N,n)$, is applied to Analog Gate 100. These Analog Gates under control of f and $\bar{f}$, respectively, in association with Analog Summing Amplifier 102 provide a left-right field multiplexed video signal as the output of Analog Summing Amplifier 102. This field multiplexed video signal is applied to Analog Shift Registers A1, A2, B1 and B2 (106, 105, 104 and 103, respectively). Analog shift Registers A1 and B1 each provide storage for 263 television lines of video information and Analog Shift Registers A2 and B2 each provide storage for 262 television lines of video information. It is noted that these numbers may be reduced by the number of inactive TV lines with suitable modification of the shift control signals. During an odd numbered frame, indicated by F=1, Analog Shift Register A1 is loaded with the left image video signal corresponding to the line sequence n=1, 5, 9 ... 525, followed by the right image video signal corresponding to the line sequence, n=4, 8, 12 ... 524, by Shift Clock C1 under control of timing signal y by means of logic elements 120, 121 and 122. Similarly, during the same odd numbered frame, Analog Shift Register A2 is loaded with the left image video signal corresponding to the line sequence, n=3, 7, 11 ... 523 followed by the right image video signal corresponding to the line sequence n=2, 6, 10 ... 522 by Shift Clock C1 under control of timing signal y by means of logic elements 116, 117 and 118.

During the succeeding even numbered frame, indicated by F=0, Analog Shift Registers A1 and A2 are read (shifted) out sequentially. Analog Shift Register A1 is shifted out during the odd field, indicated by f=1, by Shift Clock C1 by means of logic elements 119, 121 and 122. Analog Shift Register A2 is shifted out during the even field, indicated by f=0, by Shift Clock C1 by means of logic elements 115, 117 and 118. The video output signals emerging from Analog Shift Registers A1 and A2 are gated by their associated Analog Gates 126 and 125, respectively, into Analog Summing Amplifier 127. The resulting output is shown as $V_d(N,n)$ in FIG. 10i.

Analog Shift Registers B1 and B2 (103 and 104) and their associated logic elements perform the identical function during the conjugate frames. That is, while Analog Shift Registers A1 and A2 are read out (F=0), Analog Shift Registers B1 and B2 are loaded, and while Analog Shift Registers B1 and B2 are read out (F=1), Analog Shift Registers A1 and A2 are loaded. This results in an uninterrupted 4:1 interlace signal appearing at the output of Analog Summing Amplifier 127. Chrominance Inverter 128 and its associated Analog Gates 129 and 130 provide the chrominance inversion necessary to maintain the correct phase relationship with the chrominance subcarrier. The output of Analog Summing Amplifier 131, $V_c(N,n)$ is converted video signal, and is displayed in a 4:1 interlace format.

The frequency of Shift Clock C1 must satisfy the Sampling Theorem. A practical implementation requires the frequency of Shift Clock C1 to be somewhat greater than twice the highest frequency of interest.

A shift clock frequency equal to $2\frac{1}{2}$ times the chrominance subcarrier oscillator frequency satisifies this requirement, and may be conveniently derived by: (a) Forming a square wave of the chrominance subcarrier, then (b) Extracting the fifth harmonic of this square wave, by means of a bandpass filter, then (c) Forming a square wave of this fifth harmonic, and then (d) Halving the frequency of this square wave by means of a counter of two.

The "bit" length of the Analog Shift Registers are determined as the product of: (a) The number of TV lines stored, and (b) The time (seconds) per TV line, and (c) The frequency (Hertz) of Shift Clock C1.

III. The Double 2:1 Interlace Converter

This converter provides full vertical resolution of left and right images as provided by the non-standard (stereoscopic) receiver, to each eye, in a double 2:1 interlaced format. This is performed by providing a full left image field comprising its odd numbered lines; followed by a full right image field comprising its odd numbered lines; followed by a full left image field comprising its even numbered lines; followed by a full right image field comprising its even numbered lines, during one frame time. The resulting image sequence, left-right-left-right, provides each eye with a 60 Hertz flash rate, as in standard television receivers, thus alleviating the flicker problem of the 2:1 Interlace Converter, and simultaneously provides each eye with the full vertical resolution available in the source signals. This is performed by outputting the video information at twice the standard rate, interleaved in the format and line sequence shown in FIG. 10j.

The resulting imagery, appearing on a single display device, must be viewed with special spectacles, or a functional equivalent, that unblock the left and right eyes in synchronism with the left and right fields displayed.

Figure 8:
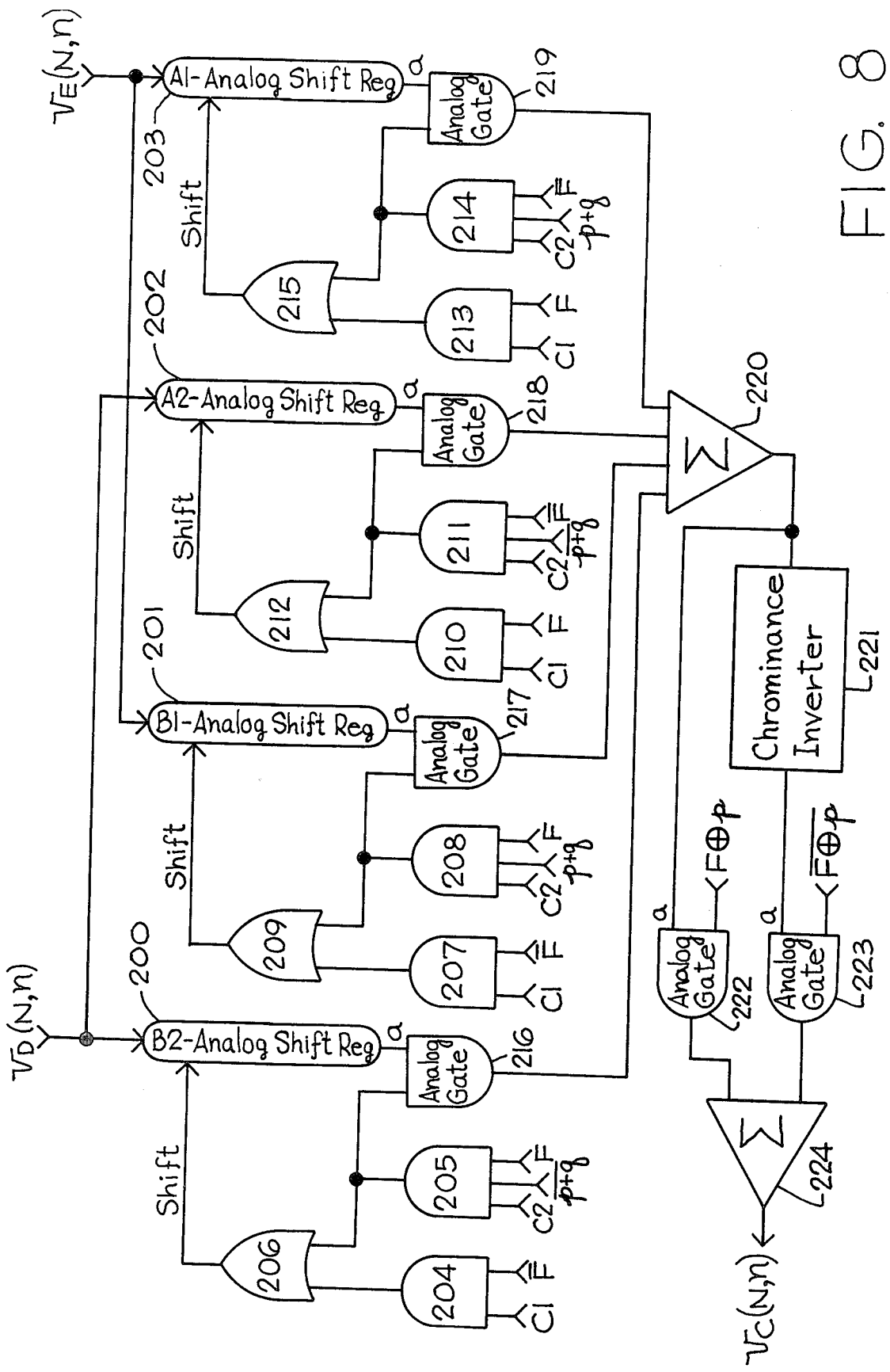
FIG. 8 is a block diagram of the Double 2:1 Interlace Converter.

The double 2:1 interlace converter implementation is shown in FIG. 8. As shown therein, the left image video signal, represented by $V_E(N,n)$, is applied to Analog Shift Registers A1, B1 (203, 201), and the right image video signal, represented by $V_D(N,n)$, is applied to Analog Shift Registers A2, B2 (202, 200). Each of the four Analog Shift Registers provide storage for 525 television lines (1 frame) of video information. It is noted that this number may be reduced by the number of inactive TV lines with suitable modification of the shift control signals. During an odd numbered frame, indicated by F=1, Analog Shift Register A1 is loaded with the left image video signal, comprising a full frame by Shift Clock C1 by means of logic elements 213 and 215. Similarly, during the same odd numbered frame, Analog Shift Register A2 is loaded with the right image video signal, comprising a full frame by Shift Clock C1 by means of logic elements 210 and 212.

During the succeeding even numbered frame, indicated by F=0, Analog Shift Register A1 is read (shifted) out by Shift Clock C2 (twice the frequency of C1) under control of timing signal $\overline{p+q}$ by means of logic elements 214 and 215. Similarly, during the same even numbered frame, Analog Shift Register A2 is read (shifted) out by Shift Clock C2 under control of timing signal $\overline{p+q}$ by means of logic elements 211 and 212. The video output signals emerging from Analog Shift Registers A1 and A2 are gated by their associated Analog Gates 219 and 218, respectively, into Analog Summing Amplifier 220. The resulting output is shown as $V_c(N,n)$ in FIG. 10j.

Analog Shift Registers B1 and B2 (201 and 200) and their associated logic elements perform the identical function during the conjugate frames. That is, while Analog Shift Registers A1 and A2 are read out (F=0), Analog Shift Registers B1 and B2 are loaded, and while Analog Shift Registers B1 and B2 are read out (F=1), Analog Shift Registers A1 and A2 are loaded. This results in an uninterrupted double 2:1 interlace signal appearing at the output of Analog Summing Amplifier 220. Chrominance Inverter 221 and its associated Analog Gates 222 and 223, provide the chrominance inversion necessary to maintain the correct phase relationship with the double rate chrominance subcarrier. The output of Analog Summing Amplifier 224, $V_c(N,n)$, is the converted video signal, and is displayed in a double 2:1 interlace format.

Shift Clock C1 may be derived as described above in conjunction with the 4:1 Interlace Converter, while Shift Clock C2, which is inherent in the above process is available as the square wave of the fifth harmonic of the chrominance subcarrier oscillator.

The "bit" length of the Analog Shift Registers are determined as described above in conjunction with the 4:1 Interlace Converter.

In the exemplary encoder embodiments, the polarity of the amplitude scaled second video signal is alternated at the frame rate, with the alternation occurring at midframe time. In the corresponding exemplary decoder embodiments, the second video signal is recovered by the absolute differencing function provided by synchronously multiplexing the appropriately formed algebraic difference signals.

The exemplary embodiments, however, are not intended to restrict the encoder polarity alternation to midframe time, nor to limit the means for forming the absolute differencing function of the decoder to the synchronous multiplexing method shown. Indeed, the time of polarity alternation provided by the encoder, may set at any selected time in the frame provided that the corresponding decoder effects the requisite absolute differencing function indicated.

As an example, if the time of polarity alternation provided by the encoder were selected at the beginning of the frame rather than midframe, the encoder and decoder embodiments would be modified as follows:

(1) replace the gating signal $F \oplus f$ and $\overline{F \oplus f}$ shown in FIGS. 1, 2, 3 and 5 by F and $\overline{F}$, respectively, and
(2) delete Analog Difference Amplifiers 75 and 78 and Analog Gates 79 and 82 shown in FIG. 4, and
(3) replace the gating signals Ff and $\overline{Ff}$ shown in FIG. 4 by $\overline{F}$ and F, respectively.

Although not specifically indicated, the recovered composite video signal, representing the imagery of the first video source, and the decoded video signal, representing the imagery of the second video source, are each processed by conventional luminance and chrominance circuitry to provide the Y, (R−Y), (G−Y) and (B−Y) signals as required by a three gun (or equivalent) picture tube. The chrominance circuitry includes a chrominance demodulator.

As indicated in the exemplary encoder, decoder and converter embodiments, the function of the Chrominance Inverter is to correct the phase of the delayed (by an odd number of television lines) video signal relative to the chrominance subcarrier reference signal.

The equivalent function may be performed by alternating, at the applicable rate and time, the polarity of the chrominance subcarrier reference signal as applied to the chrominance demodulator, thus permitting the deletion of the Chrominance Inverter and associated circuitry from the exemplary decoder and converter embodiments.

COMPONENT CONSIDERATIONS

The components used in the encoder decoder and converter embodiments all utilize conventional technologies, however, the currently emerging charge coupled device (CCD) technology may provide a significant cost and size advantage when applied to the Frame Delay Units shown in the encoder and decoder embodiments and the Analog Shift Registers shown in the converter embodiments.

Fairchild Camera and Instrument Corp. is currently developing a television field store device based on charge coupled device technology. The design objectives of this device are to provide storage capacity of 640×256 picture elements, corresponding to 163,840 analog "bits" at a maximum bit rate of 12 MHz, on a chip area of 170 mil×760 mil.

Although the invention has been described as applied to the NTSC system of television, it can, with suitable modification, be made to apply to other television systems such as, for example, modified NTSC (625 lines/50 fields), Phase Alternation Line (PAL) or Sequential with Memory (SECAM).

Similarly, although the invention has been described as applied in color television systems, it is also applicable to monochromatic television systems.

Accordingly, it is clear that the above description of the alternative and preferred embodiments in no way limits the scope of the present invention which is defined by the following claims.

What is claimed is:

1. A television system comprising:
   (a) means for providing a first video signal;
   (b) means for providing a second video signal in time synchronism with said first video signal;
   (c) encoding means for forming a composite video signal of said first video signal and said second video signal, said encoding means including means for amplitude scaling said first video signal and said second video signal and means for alternating the polarity of said amplitude scaled second video signal; and
   (d) means for transmitting said composite video signal to means for receiving said composite video signal, said receiving means including means for decoding said second video signal from said received composite video signal, said decoding means including means for amplitude scaling said received composite video signal and means for delaying said amplitude scaled received composite video signal.

2. A television system as recited in claim 1 further including means for displaying said decoded second video signal to render the imagery corresponding to said second video signal.

3. A television system comprising:
   (a) means for providing a first video signal;
   (b) means for providing a second video signal in time synchronism with said first video signal;
   (c) encoding means for forming a composite video signal of said first video signal and said second video signal, said encoding means including means for amplitude scaling said first video signal and said second video signal and means for alternating the polarity of said amplitude scaled second video signal; and
   (d) means for transmitting said composite video signal to means for receiving said composite video signal, said receiving means including:
      (1) means for recovering said composite video signal from said received composite video signal; and
      (2) means for decoding said second video signal from said received composite video signal, said decoding means including means for amplitude scaling said received composite video signal and means for delaying said amplitude scaled received composite video signal.

4. A television system as recited in claim 3 further including means for displaying said composite video signal to render the imagery corresponding to said first video signal.

5. A television system as recited in claim 3 further including means for displaying said decoded second video signal to render the imagery corresponding to said second video signal.

6. A television system as recited in claim 3 further including means for displaying:
   (a) said composite video signal to render the imagery corresponding to said first video signal; and
   (b) said decoded second video signal to render the imagery corresponding to said second video signal.

7. A television system as recited in claim 6 wherein said first video signal and said second video signal comprise a stereoscopic pair.

8. A television system as recited in claim 7 wherein said displaying means includes means for converting said composite video signal and said decoded second video signal into a time multiplexed video signal for time sequential stereoscopic presentation on a single display device.

9. A television system as recited in claim 8 wherein said single display device comprises a cathode ray tube.

10. A television system comprising:
    (a) means for providing a first video signal;
    (b) means for providing a second video signal in time synchronism with said first video signal;
    (c) encoding means for forming a composite video signal of said first video signal and said second video signal, said encoding means including:
       (1) means for scaling the amplitude of said first video signal by a first factor;
       (2) means for scaling the amplitude of said second video signal by a second factor;
       (3) means for alternating the polarity of said scaled second video signal at the frame rate; and
       (4) means for summing said scaled first video signal and said alternating polarity second video signal to form said composite video signal;
    (d) means for transmitting said composite video signal to means for receiving said composite video signal, said receiving means including:
       (1) means for recovering said composite video signal from said received composite video signal; and
       (2) means for decoding said second video signal from said received composite video signal, said decoding means including:
          (a) means for scaling the amplitude of said received composite video signal by the scaling inverse of said second factor;
          (b) means for delaying said scaled composite video signal for one frame time;
          (c) means for correcting the chrominance phase of said delayed composite video signal relative to the chrominance subcarrier reference signal; and
          (d) means for forming the absolute difference between said scaled composite video signal and said chrominance phase corrected video signal to recover said second video signal.

11. A television system as recited in claim 10 further including means for displaying said composite video signal to render the imagery corresponding to said first video signal.

12. A television system as recited in claim 10 further including means for displaying said decoded second video signal to render the imagery corresponding to said second video signal.

13. A television system as recited in claim 10 further including means for displaying:
    (a) said composite video signal to render the imagery corresponding to said first video signal; and
    (b) said decoded second video signal to render the imagery corresponding to said second video signal.

14. A television system as recited in claim 13 wherein said first video signal and said second video signal comprise a stereoscopic pair.

15. A television system as recited in claim 14 wherein said displaying means includes means for converting said composite video signal and said decoded second video signal into a time multiplexed video signal for time sequential stereoscopic presentation on a single display device.

16. A television system as recited in claim 15 wherein said converting means comprises a 2:1 interlace converter.

17. A television system as recited in claim 16 wherein said single display device comprises a cathode ray tube.

18. A television system as recited in claim 15 wherein said converting means comprises a double 2:1 interlace converter.

19. A television system as recited in claim 18 wherein said single display device comprises a cathode ray tube.

20. A television system as recited in claim 15 wherein said converting means comprises a 4:1 interlace converter.

21. A television system as recited in claim 20 wherein said single display device comprises a cathode ray tube.

22. A television system comprising:
(a) means for providing a first video signal;
(b) means for providing a second video signal in time synchronism with said first video signal;
(c) encoding means for forming a composite video signal of said first video signal and said second video signal, said encoding means including:
  (1) means for scaling the amplitude of said first video signal by a first factor;
  (2) means for scaling the amplitude of said second video signal by a second factor;
  (3) means for alternating the polarity of said scaled second video signal at the frame rate, said alternation occurring in midframe; and
  (4) means for summing said scaled first video signal and alternating polarity second video signal to form said composite video signal;
(d) means for transmitting said composite video signal to means for receiving said composite video signal, said receiving means including:
  (1) means for recovering said composite video signal from said received composite video signal; and
  (2) means for decoding said second video signal from said received composite video signal, said decoding means including:
    (a) means for scaling the amplitude of said received composite video signal by the scaling inverse of said second factor;
    (b) means for delaying said scaled composite video signal for one frame time;
    (c) means for generating a modified delayed composite video signal, said generating means including means for inverting the polarity of the chrominance component of said delayed composite video signal;
    (d) means for forming a plurality of difference signals including a first difference signal comprising the difference between said modified delayed composite video signal and said scaled composite video signal, and a second difference signal comprising the difference between said scaled composite video signal and said modified delayed composite video signal;
    (e) means for time multiplexing said plurality of difference signals such that said first difference signal is passed during the conjunction of odd numbered frames and even numbered fields and during the conjunction of even numbered frames and odd numbered fields, and said second difference signal is passed during the conjunction of odd numbered frames and odd numbered fields and during the conjunction of even numbered frames and even numbered fields; and
    (f) means for summing said multiplexed difference signals to recover said second video signal.

23. A television system comprising:
(a) means for providing a first video signal;
(b) means for providing a second video signal in time synchronism with said first video signal;
(c) encoding means for forming a composite video signal of said first video signal and said second video signal, said encoding means including:
  (1) means for scaling the amplitude of said first video signal by a first factor;
  (2) means for scaling the amplitude of said second video signal by a second factor;
  (3) means for alternating the polarity of said scaled second video signal at the line rate; and
  (4) means for summing said scaled first video signal and said alternating polarity second video signal to form said composite video signal;
(d) means for transmitting said composite video signal to means for receiving said composite video signal, said receiving means including:
  (1) means for recovering said composite video signal from said received composite video signal; and
  (2) means for decoding said second video signal from said received composite video signal, said decoding means including:
    (a) means for scaling the amplitude of said received composite video signal by the scaling inverse of said second factor;
    (b) means for delaying said scaled composite video signal for one line time;
    (c) means for correcting the chrominance phase of said delayed composite video signal relative to the chrominance subcarrier reference signal; and
    (d) means for forming the absolute difference between said scaled composite video signal and said chrominance corrected video signal to recover said second video signal.

24. A television system as recited in claim 23 further including means for displaying said composite video signal to render the imagery corresponding to said first video signal.

25. A television system as recited in claim 23 further including means for displaying said decoded second video signal to render the imagery corresponding to said second video signal.

26. A television system as recited in claim 23 further including means for displaying:
(a) said composite video signal to render the imagery corresponding to said first video signal; and
(b) said decoded second video signal to render the imagery corresponding to said second video signal.

27. A television system as recited in claim 26 wherein said first video signal and said second video signal comprise a stereoscopic pair.

28. A television system as recited in claim 27 wherein said displaying means includes means for converting said composite video signal and said decoded second video signal into a time multiplexed video signal for time sequential stereoscopic presentation on a single display device.

29. A television system as recited in claim 28 wherein said converting means comprises a 2:1 interlace converter.

30. A television system as recited in claim 29 wherein said single display device comprises a cathode ray tube.

31. A television system as recited in claim 28 wherein said converting means comprises a double 2:1 interlace converter.

32. A television system as recited in claim 31 wherein said single display device comprises a cathode ray tube.

33. A television system as recited in claim 28 wherein said converting means comprises a 4:1 interlace converter.

34. A television system as recited in claim 33 wherein said single display device comprises a cathode ray tube.

35. A television system comprising:
 (a) means for providing a first video signal;
 (b) means for providing a second video signal in time synchronism with said first video signal;
 (c) encoding means for forming a composite video signal of said first video signal and said second video signal, said encoding means including:
  (1) means for scaling the amplitude of said first video signal by a first factor;
  (2) means for scaling the amplitude of said second video signal by a second factor;
  (3) means for alternating the polarity of said scaled second video signal at the line rate, said alternation occurring between successive lines; and
  (4) means for summing said scaled first video signal and said alternating polarity second video signal to form said composite video signal;
 (d) means for transmitting said composite video signal to means for receiving said composite video signal, said receiving means including:
  (1) means for recovering said composite video signal from said received composite video signal; and
  (2) means for decoding said second video signal from said received composite video signal, said decoding means including:
   (a) means for scaling the amplitude of said received composite video signal by the scaling inverse of said second factor;
   (b) means for delaying said scaled composite video signal for one line time;
   (c) means for generating a modified delayed composite video signal, said generating means including means for inverting the polarity of the chrominance component of said delayed composite video signal;
   (d) means for forming a plurality of difference signals including a first difference signal comprising the difference between said modified delayed composite video signal and said scaled composite video signal, and a second difference signal comprising the difference between said scaled composite video signal and said modified delayed composite video signal;
   (e) means for time multiplexing said plurality of difference signals such that said first difference signal is passed during the conjunction of odd numbered frames and the line sequence n=3, 7, 11 ... (L−2), 2, 6, 10 ... (L−3) and during the conjunction of even numbered frames and the line sequence n=1, 5, 9 ... L, 4, 8, 12 ... (L−1), and said second difference signal is passed during the conjunction of odd numbered frames and the line sequence n=1, 5, 9 ... L, 4, 8, 12 ... (L−1) and during the conjunction of even numbered frames and the line sequence n=3, 7, 11 ... (L−2), 2, 6, 10 ... (L−3), wherein L corresponds to the number of television lines comprising a frame; and
   (f) means for summing said multiplexed difference signals to recover said second video signal.

36. A television system comprising:
 (a) means for providing a first video signal;
 (b) means for providing a second video signal in time synchronism with said first video signal;
 (c) encoding means for forming a composite video signal of said first video signal and said second video signal, said encoding means including:
  (1) means for scaling the amplitude of said first video signal by a first factor;
  (2) means for scaling the amplitude of said second video signal by a second factor;
  (3) means for alternating the polarity of said scaled second video signal at the field rate; and
  (4) means for summing said scaled first video signal and said alternating polarity second video signal to form said composite video signal;
 (d) means for transmitting said composite video signal to means for receiving said composite video signal, said receiving means including:
  (1) means for recovering said composite video signal from said received composite video signal; and
  (2) means for decoding said second video signal from said received composite video signal, said decoding means including:
   (a) means for scaling the amplitude of said received composite video signal by the scaling inverse of said second factor;
   (b) means for delaying said scaled composite video signal for one field less one half line time;
   (c) means for forming the absolute difference between said scaled composite video signal and said delayed composite video signal to recover said second video signal.

37. A television system as recited in claim 36 further including means for displaying said composite video signal to render the imagery corresponding to said first video signal.

38. A television system as recited in claim 36 further including means for displaying said decoded second video signal to render the imagery corresponding to said second video signal.

39. A television system as recited in claim 36 further including means for displaying:
 (a) said composite video signal to render the imagery corresponding to said first video signal; and
 (b) said decoded second video signal to render the imagery corresponding to said second video signal.

40. A television system as recited in claim 39 wherein said first video signal and said second video signal comprise a stereoscopic pair.

41. A television system as recited in claim 40 wherein said displaying means includes means for converting said composite video signal and said decoded second video signal into a time multiplexed video signal for time sequential stereoscopic presentation on a single display device.

42. A television system as recited in claim 41 wherein said converting means comprises a 2:1 interlace converter.

43. A television system as recited in claim 42 wherein said single display device comprises a cathode ray tube.

44. A television system as recited in claim 41 wherein said converting means comprises a double 2:1 interlace converter.

45. A television system as recited in claim 44 wherein said single display device comprises a cathode ray tube.

46. A television system as recited in claim 41 wherein said converting means comprises a 4:1 interlace converter.

47. A television system as recited in claim 46 wherein said single display device comprises a cathode ray tube.

48. A television system comprising:
(a) means for providing a first video signal;
(b) means for providing a second video signal in time synchronism with said first video signal;
(c) encoding means for forming a composite video signal of said first video signal and said second video signal, said encoding means including:
 (1) means for scaling the amplitude of said first video signal by a first factor;
 (2) means for scaling the amplitude of said second video signal by a second factor;
 (3) means for alternating the polarity of said scaled second video signal at the field rate; and
 (4) means for summing said scaled first video signal and said alternating polarity second video signal to form said composite videos signal;
(d) means for transmitting said composite video signal to means for receiving said composite video signal, said receiving means including:
 (1) means for recovering said composite video signal from said received composite video signal; and
 (2) means for decoding said second video signal from said received composite video signal, said decoding means including:
  (a) means for scaling the amplitude of said received composite video signal by the scaling inverse of said second factor;
  (b) means for delaying said scaled composite video signal for one field less one half line time;
  (c) means for forming a plurality of difference signals including a first difference signal comprising the difference between said delayed composite video signal and said scaled composite video signal, and a second difference signal comprising the difference between said scaled composite video signal and said delayed composite video signal;
  (d) means for time multiplexing said plurality of difference signals such that said first difference signal is passed during odd numbered fields and said second difference signal is passed during even numbered fields; and
  (e) means for summing said multiplexed difference signals to recover said second video signal.

49. A television system comprising:
(a) means for providing a first video signal;
(b) means for providing a second video signal in time synchronism with said first video signal;
(c) encoding means for forming a composite video signal of said first video signal and said second video signal, said encoding means including:
 (1) means for scaling the amplitude of said first video signal by a first factor;
 (2) means for scaling the amplitude of said second video signal by a second factor;
 (3) means for alternating the polarity of said scaled second video signal at the frame rate;
 (4) means for delaying said scaled first video signal for one frame time;
 (5) means for correcting the chrominance phase of said delayed first video signal relative to the chrominance subcarrier reference signal;
 (6) multiplexing means for generating a multiplexed first video signal, said multiplexing means including means for time multiplexing said scaled first video signal and said chrominance phase corrected video signal such that said scaled first video signal is passed during odd numbered frames and said chrominance phase corrected video signal is passed during even numbered frames; and
 (7) means for summing said multiplexed first video signal and said alternating polarity second video signal to form said composite video signal;
(d) means for transmitting said composite video signal to means for receiving said composite video signal, said receiving means including:
 (1) means for recovering said composite video signal from said received composite video signal; and
 (2) means for decoding said second video signal from said received composite video signal, said decoding means including:
  (a) means for scaling the amplitude of said received composite video signal by the scaling inverse of said second factor;
  (b) first means for delaying said scaled composite video signal for one frame time;
  (c) second means for delaying said delayed composite video signal for one frame time;
  (d) means for correcting the chrominance phase of said one frame delayed composite video signal relative to the chrominance subcarrier reference signal; and
  (e) means for forming, during even numbered frames, the absolute difference between said scaled composite video signal and said chrominance phase corrected video signal, and during odd numbered frames, the absolute difference between said chrominance phase corrected video signal and said two frame delayed composite video signal, to recover said second vido signal.

50. A television system as recited in claim 49 further including means for displaying said composite video signal to render the imagery corresponding to said first video signal.

51. A television system as recited in claim 49 further including means for displaying said decoded second video signal to render the imagery corresponding to said second video signal.

52. A television system as recited in claim 49 further including means for displaying:
(a) said composite video signal to render the imagery corresponding to said first video signal; and (b) said decoded second video signal to render the imagery corresponding to said second video signal.

53. A television system as recited in claim 52 wherein said first video signal and said second video signal comprise a stereoscopic pair.

54. A television system as recited in claim 53 wherein said displaying means includes means for converting said composite video signal and said decoded second video signal into a time multiplexed video signal for time sequential presentation on a single display device.

55. A television system as recited in claim 54 wherein said converting means comprises a 2:1 interlace converter.

56. A television system as recited in claim 55 wherein said single display device comprises a cathode ray tube.

57. A television system as recited in claim 54 wherein said converting means comprises a double 2:1 interlace converter.

58. A television system as recited in claim 57 wherein said single display device comprises a cathode ray tube.

59. A television system as recited in claim 54 wherein said converting means comprises a 4:1 interlace converter.

60. A television system as recited in claim 59 wherein said single display device comprises a cathode ray tube.

61. A television system comprising:
   (a) means for providing a first video signal;
   (b) means for providing a second video signal in time synchronism with said first video signal;
   (c) encoding means for forming a composite video signal of said first video signal and said second video signal, said encoding means including:
      (1) means for scaling the amplitude of said first video signal by a first factor;
      (2) means for scaling the amplitude of said second video signal by a second factor;
      (3) means for alternating the polarity of said scaled second video signal at the frame rate, said alternation occurring in midframe;
      (4) means for delaying said scaled first video signal for one frame time;
      (5) means for generating a modified delayed first video signal, said generating means including means for inverting the polarity of the chrominance component of said delayed first video signal;
      (6) multiplexing means for generating a multiplexed first video signal, said multiplexing means including means for time multiplexing said scaled first video signal and said modified first video signal such that said scaled first video signal is passed during odd numbered frames and said modified first video signal is passed during even numbered frames; and
      (7) means for summing said multiplexed first video signal and said alternating polarity second video signal to form said composite video signal;
   (d) means for transmitting said composite video signal to means for receiving said composite video signal, said receiving means including:
      (1) means for recovering said composite video signal from said received composite video signal; and
      (2) means for decoding said second video signal from said received composite video signal, said decoding means including:
         (a) means for scaling the amplitude of said received composite video signal by the scaling inverse of said second factor;
         (b) first means for delaying said scaled composite video signal for one frame time;
         (c) second means for delaying said delayed composite video signal for one frame time;
         (d) means for generating a modified one frame delayed composite video signal, said generating means including means for inverting the polarity of the chrominance component of said one frame delayed composite video signal;
         (e) means for forming a plurality of difference signals including a first difference signal comprising the difference between said two frame delayed composite video signal and said modified composite video signal, a second difference signal comprising the difference between said modified composite video signal and said two frame delayed video signal, a third difference signal comprising the difference between said modified composite video signal and said scaled composite video signal, and a fourth difference signal comprising the difference between said scaled composite video signal and said modified composite video signal;
         (f) means for time multiplexing said plurality of difference signals such that said first difference signal is passed during the conjunction of odd numbered frames and odd numbered fields, said second difference signal is passed during the conjunction of odd numbered frames and even numbered fields, said third difference signal is passed during the conjunction of even numbered frames and odd numbered fields, and said fourth difference signal is passed during the conjunction of even numbered frames and even numbered fields; and
         (g) means for summing said multiplexed difference signals to recover said second video signal.

62. A television system comprising:
   (a) means for providing a first video signal;
   (b) means for providing a second video signal in time synchronism with said first video signal;
   (c) encoding means for forming a composite video signal of said first video signal and said second video signal, said encoding means including:
      (1) means for scaling the amplitude of said first video signal by a first factor;
      (2) means for scaling the amplitude of said second video signal by a second factor;
      (3) means for alternating the polarity of said scaled second video signal at the frame rate;
      (4) first means for delaying said scaled first video signal for one frame time;
      (5) second means for delaying said delayed first video signal for one frame time;
      (6) means for correcting the chrominance phase of said one frame delayed first video signal relative to the chrominance subcarrier reference signal;
      (7) means for forming a plurality of sum signals including a first sum signal comprising the sum of said scaled first video signal and said chrominance phase corrected video signal, and a second sum signal comprising the sum of said two frame delayed first video signal and said chrominance phase corrected video signal;

(8) multiplexing means for generating a multiplexed first video signal, said multiplexing means including means for time multiplexing said first sum signal and said second sum signal such that said first sum signal is passed during odd numbered frames and said second sum signal is passed during even numbered frames; and (9) means for summing said multiplexed first video signal and said alternating polarity second video signal to form said composite video signal;

(d) means for transmitting said composite video signal to means for receiving said composite video signal, said receiving means including:

(1) means for recovering said composite video signal from said received composite video signal; and (2) means for decoding said second video signal from said received composite video signal, said decoding means including:

(a) means for scaling the amplitude of said received composite video signal by the scaling inverse of said second factor;

(b) first means for delaying said scaled composite video signal for one frame time;

(c) second means for delaying said delayed composite video signal for one frame time;

(d) means for correcting the chrominance phase of said one frame delayed composite video signal relative to the chrominance subcarrier reference signal; and (e) means for forming, during even numbered frames, the absolute difference between said scaled composite video signal and said chrominance phase corrected video signal, and during odd numbered frames, the absolute difference between said chrominance phase corrected video signal and said two frame delayed composite video signal, to recover said second video signal.

63. A television system as recited in claim 62 further including means for displaying said composite video signal to render the imagery corresponding to said first video signal.

64. A television system as recited in claim 62 further including means for displaying said decoded second video signal to render the imagery corresponding to said second video signal.

65. A television system as recited in claim 62 further including means for displaying:

(a) said composite video signal to render the imagery corresponding to said first video signal; and (b) said decoded second video signal to render the imagery corresponding to said second video signal.

66. A television system as recited in claim 65 wherein said first video signal and said second video signal comprise a stereoscopic pair.

67. A television system as recited in claim 66 wherein said displaying means includes means for converting said composite video signal and said decoded second video signal into a time multiplexed video signal for time sequential stereoscopic presentation on a single display device.

68. A television system as recited in claim 67 wherein said converting means comprises a 2:1 interlace converter.

69. A television system as recited in claim 68 wherein said single display device comprises a cathode ray tube.

70. A television system as recited in claim 67 wherein said converting means comprises a double 2:1 interlace converter.

71. A television system as recited in claim 70 wherein said single display device comprises a cathode ray tube.

72. A television system as recited in claim 67 wherein said converting means comprises a 4:1 interlace converter.

73. A television system as recited in claim 72 wherein said single display device comprises a cathode ray tube.

74. A television system comprising:

(a) means for providing a first video signal;

(b) means for providing a second video signal in time synchronism with said first video signal;

(c) encoding means for forming a composite video signal of said first video signal and said second video signal, said encoding means including:

(1) means for scaling the amplitude of said first video signal by a first factor;

(2) means for scaling the amplitude of said second video signal by a second factor;

(3) means for alternating the polarity of said scaled second video signal at the frame rate, said alternation occurring in midframe;

(4) first means for delaying said scaled first video signal for one frame time;

(5) second means for delaying said delayed first video signal for one frame time;

(6) means for generating a modified one frame delayed first video signal, said generating means including means for inverting the polarity of the chrominance component of said one frame delayed first video signal;

(7) means for forming a plurality of sum signals including a first sum signal comprising the sum of said scaled first video signal and said modified one frame delayed first video signal, and a second sum signal comprising the sum of said two frame delayed first video signal and said modified one frame delayed first video signal;

(8) multiplexing means for generating a multiplexed first video signal, said multiplexing means including means for time multiplexing said first sum signal and said second sum signal such that said first sum signal is passed during odd numbered frames and said second sum signal is passed during even numbered frames; and (9) means for summing said multiplexed first video signal and said alternating polarity second video signal to form said composite video signal;

(d) means for transmitting said composite video signal to means for receiving said composite video signal, said receiving means including:

(1) means for recovering said composite video signal from said received composite video signal; and (2) means for decoding said second video signal from said received composite video signal, said decoding means including:

(a) means for scaling the amplitude of said received composite video signal by the scaling inverse of said second factor;

(b) first means for delaying said scaled composite video signal for one frame time;

(c) second means for delaying said delayed composite video signal for one frame time;

(d) means for generating a modified one frame delayed composite video signal, said generating means including means for inverting the polarity of the chrominance component of said one frame delayed composite video signal;

(e) means for forming a plurality of difference signals including a first difference signal comprising the difference between said two frame delayed composite video signal and said modified composite video signal, a second difference signal comprising the difference between said modified composite video signal and said two frame delayed composite video signal, a third difference signal comprising the difference between said modified composite video signal and said scaled composite video signal, and a fourth difference signal comprising the difference between said scaled composite video signal and said modified composite video signal;

(f) means for time multiplexing said plurality of difference signals such that said first difference signal is passed during the conjunction of odd numbered frames and odd numbered fields, said second difference signal is passed during the conjunction of odd numbered frames and even numbered fields, said third difference signal is passed during the conjunction of even numbered frames and odd numbered fields, and said fourth difference signal is passed during the conjunction of even numbered frames and even numbered fields; and (g) means for summing said multiplexed difference signals to recover said second video signal.

75. A converter to provide a time multiplexed video signal, in a 4:1 interlaced format, of a stereoscopic pair of video signals comprising a left image video signal and a right image video signal, said converter including:

(a) means for reordering the television line sequence of said pair of video signals to provide a left-right-left-right image field sequence of said left image video signal and said right image video signal in a 4:1 interlaced format;

(b) means for time multiplexing said reordered television line sequence to provide a time multiplexed video signal; and (c) means for correcting the chrominance phase of said time multiplexed video signal relative to the chrominance subcarrier reference signal.

76. A converter to provide a time multiplexed video signal, in a 4:1 interlaced format, of a stereoscopic pair of video signals comprising a left image video signal and a right image video signal, said converter including:

(a) means for time multiplexing said left image video signal and said right image video signal to form a left-right field multiplexed video signal;

(b) a plurality of storing means including first means for storing a first number of television lines of video information, second means for storing a second number of television lines of video information, third means for storing a third number of television lines of video information, and fourth means for storing a fourth number of television lines of video information;

(c) means for applying said left-right field multiplexed video signal to each of said plurality of storing means;

(d) first means for loading said first storing means during odd numbered frames with a first sequence of television lines;

(e) first means for sequentially reading out the contents of said first storing means during the odd field time of the next even numbered frame;

(f) second means for loading said second storing means during odd numbered frames with a second sequence of television lines;

(g) second means for sequentially reading out the contents of said second storing means during the even field time of the next even numbered frame;

(h) third means for loading said third storing means during even numbered frames with a third sequence of television lines;

(i) third means for sequentially reading out the contents of said third storing means during the odd field time of the next odd numbered frame;

(j) fourth means for loading said fourth storing means during even numbered frames with a fourth sequence of television lines;

(k) fourth means for sequentially reading out the contents of said fourth storing means during the even field time of the next odd numbered frame;

(l) common clocking means for loading in and sequentially reading out the contents of each of said plurality of storing means wherein the frequency of said common clocking means is equal to or greater than twice the highest frequency of interest;

(m) means for summing said sequentially read out contents of said plurality of storing means; and (n) means for correcting the chrominance phase of said summed video signal relative to the chrominance subcarrier reference signal.

77. A converter as recited in claim 76 wherein said first number is $(L+1)/2$, said second number is $(L-1)/2$, said third number is $(L+1)/2$, said fourth number is $(L-1)/2$, said first line sequence is that portion of the left image video signal corresponding to the line sequence $n=1, 5, 9 \ldots L$ followed by that portion of the right image video signal corresponding to the line sequence $n=4, 8, 12 \ldots L-1$, said second line sequence is that portion of the left image video signal corresponding to the line sequence $n=3, 7, 11 \ldots L-2$ followed by that portion of the right image video signal corresponding to the line sequence $n=2, 6, 10 \ldots L-3$, said third line sequence is that portion of the left image video signal corresponding to the line sequence $n=1, 5, 9 \ldots L$ followed by that portion of the right image video signal corresponding to the line sequence $n=4, 8, 12 \ldots L-1$, and said fourth line sequence is that portion of the left image video signal corresponding to the line sequence $n=3, 7, 11 \ldots L-2$ followed by that portion of the right image video signal corresponding to the line sequence $n=2, 6, 10 \ldots L-3$.

78. A converter as recited in claim 77 wherein L is the number of television lines comprising a frame.

79. A converter to provide a time multiplexed video signal, in a double 2:1 interlaced format, of a stereoscopic pair of video signals comprising a left image video signal and a right image video signal, said converter including:

(a) means for interleaving the television fields of said pair of video signals to produce a left-right-left-right image field sequence of said left image video signal and said right image video signal in a 2:1 interlaced format;

(b) means for time scaling said interleaved television field sequence to provide a double rate video signal; and (c) means for correcting the chrominance phase of said double rate video signal relative to the chrominance subcarrier reference signal.

80. A converter to provide a time multiplexed video signal, in a double 2:1 interlaced format, of a stereoscopic pair of video signals comprising a left image video signal and a right image video signal, said converter including:

(a) a plurality of storing means including first means for storing a first number of television lines of video information, second means for storing a second number of television lines of video information, third means for storing a third number of television lines of video information, and fourth means for storing a fourth number of television lines of video information;

(b) means for applying said left image video signal to said first storing means and to said third storing means;

(c) means for applying said right image video signal to said second storing means and to said fourth storing means;

(d) first means for loading said first storing means during odd numbered frames with a frame of video information corresponding to said left image video signal;

(e) first means for reading out the contents of said first storing means during the next even numbered frame;

(f) second means for loading said second storing means during odd numbered frames with a frame of video information corresponding to said right image video signal;

(g) second means for reading out the contents of said second storing means during the next even numbered frame;

(h) third means for loading said third storing means during even numbered frames with a frame of video information corresponding to said left image video signal;

(i) third means for reading out the contents of said third storing means during the next odd numbered frame;

(j) fourth means for loading said fourth storing means during even numbered frames with a frame of video information corresponding to said right image video signal;

(k) fourth means for reading out the contents of said fourth storing means during the next odd numbered frame;

(l) first clocking means for loading in the contents of each of said plurality of storing means and second clocking means for reading out the contents of each of said plurality of storing means wherein the frequency of said first clocking means is equal to or greater than twice the highest frequency of interest and the frequency of said second clocking means is twice the frequency of said first clocking means;

(m) means for summing said sequentially read out contents of said plurality of storing means; and (n) means for correcting the chrominance phase of said summed video signal relative to the chrominance subcarrier reference signal.

81. A converter as recited in claim 80 wherein said first number is L, said second number is L, said third number is L, said fourth number is L, said first line sequence is that portion of the left image video signal corresponding to the line sequence $n = 1, 3, 5 \ldots L$, said second line sequence is that portion of the right image video signal corresponding to the line sequence $n = 1, 3, 5 \ldots L$, said third line sequence is that portion of the left image video signal corresponding to the line sequence $n = 2, 4, 6 \ldots L-1$, and said fourth line sequence is that portion of the right image video signal corresponding to the line sequence $n = 2, 4, 6 \ldots L-1$.

82. A converter as recited in claim 81 wherein L is the number of television lines comprising a frame.

* * * * *

UNITED STATES PATENT AND TRADEMARK OFFICE
CERTIFICATE OF CORRECTION

PATENT NO. : 4,266,240
DATED : May 5, 1981
INVENTOR(S) : Paul M. Levy

It is certified that error appears in the above-identified patent and that said Letters Patent are hereby corrected as shown below:

In column 4, line 59, "member" should correctly read --number--.

In column 6, line 32, "F⊕f and F⊕f" should correctly read --F⊕f and $\overline{F\oplus f}$--.

In column 7, line 2, "F⊕f and F⊕f" should correctly read --F⊕f and $\overline{F\oplus f}$--.

In column 7, line 3, "f and f" should correctly read --f and $\overline{f}$--.

In column 13, line 29, "$\overline{p + q}$" should correctly read --p + q--.

In column 14, line 17 "F and F" should correctly read --F and $\overline{F}$--.

In column 14, line 20, "Ff and Ff" should correctly read --$\overline{F}$f and F$\overline{f}$--.

Signed and Sealed this

Twenty-first Day of July 1981

[SEAL]

Attest:

*Attesting Officer*

GERALD J. MOSSINGHOFF

*Commissioner of Patents and Trademarks*